US010623623B2

(12) United States Patent
Hongu

(10) Patent No.: US 10,623,623 B2
(45) Date of Patent: Apr. 14, 2020

(54) LENS CONTROL APPARATUS AND CONTROL METHOD THEREOF

(71) Applicant: CANON KABUSHIKI KAISHA, Tokyo (JP)

(72) Inventor: Hideyasu Hongu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 15/689,655

(22) Filed: Aug. 29, 2017

(65) Prior Publication Data

US 2018/0063415 A1 Mar. 1, 2018

(30) Foreign Application Priority Data

Aug. 31, 2016 (JP) .................................. 2016-169610

(51) Int. Cl.
| H04N 5/232 | (2006.01) |
| G02B 7/34 | (2006.01) |
| G02B 7/28 | (2006.01) |
| G03B 13/36 | (2006.01) |
| G06K 9/00 | (2006.01) |
| G06K 9/46 | (2006.01) |

(52) U.S. Cl.
CPC .......... *H04N 5/23212* (2013.01); *G02B 7/28* (2013.01); *G02B 7/34* (2013.01); *G03B 13/36* (2013.01); *G06K 9/00624* (2013.01); *G06K 9/46* (2013.01); *H04N 5/23219* (2013.01)

(58) Field of Classification Search
None
See application file for complete search history.

(56) References Cited

U.S. PATENT DOCUMENTS

| 5,583,603 | A | * | 12/1996 | Hirasawa | G02B 7/102 348/E5.044 |
| 5,587,761 | A | * | 12/1996 | Kusaka | G02B 7/36 396/95 |
| 2003/0048372 | A1 | * | 3/2003 | Yasuda | G02B 7/102 348/349 |
| 2011/0164867 | A1 | | 7/2011 | Hamada | |
| 2013/0135516 | A1 | | 5/2013 | Kitajima | |
| 2016/0227101 | A1 | * | 8/2016 | Iwasaki | H04N 5/23212 |
| 2016/0337579 | A1 | * | 11/2016 | Tanaka | G02B 7/34 |
| 2017/0212327 | A1 | * | 7/2017 | Lee | H04N 5/23212 |

FOREIGN PATENT DOCUMENTS

| JP | 7-218818 A | 8/1995 |
| JP | 2009-128613 A | 6/2009 |
| JP | 2015-87704 A | 5/2015 |

* cited by examiner

*Primary Examiner* — Quan Pham

(74) *Attorney, Agent, or Firm* — Canon U.S.A., Inc. IP Division

(57) ABSTRACT

One or more lens control apparatuses, methods and storage mediums for use therewith are provided herein. In at least one lens control apparatus, a camera control unit determines that a subject is in focus if an amount of defocus is within a first range in a first mode where the camera control unit has not determined that the subject is a moving subject, and determines the focus state on a basis of the amount of defocus and a reversed state of a drive direction of a focus lens based on the amount of defocus in a second mode where the camera control unit has determined that the subject is a moving subject.

7 Claims, 16 Drawing Sheets

FIG. 9A

VALUE USED FOR CALCULATION OF TARGET LENS POSITION

| APERTURE [F-NUMBER] | ACTUAL VALUE USED | AVERAGE USED |
|---|---|---|
| F1.0 | 8 | 6 |
| F5.0 | ↕ | ↕ |
| F11.0 | 10 | 8 |
| LARGER THAN F11.0 | × | × |

×: THRESHOLD THAT DOES NOT DETERMINE MOVING SUBJECT

FIG. 9B

FOCAL LENGTH [mm]

| APERTURE [F-NUMBER] | | EQUAL TO OR LESS THAN 24 | 35 | 50 | 85 | 100 | 200 | 1000 |
|---|---|---|---|---|---|---|---|---|
| | F1.0 | × | 2.0 | ← | | | → | 4.0 |
| | F5.0 | × | ↕ | | | | | ↕ |
| | F11.0 | × | 3.0 | ← | | | → | 5.0 |
| | LARGER THAN F11.0 | × | × | × | × | × | × | × |

×: THRESHOLD THAT DOES NOT DETERMINE MOVING SUBJECT

| APERTURE [F-NUMBER] | FOCAL LENGTH [mm] | | | | | | |
|---|---|---|---|---|---|---|---|
| | EQUAL TO OR LESS THAN 24 | 35 | 50 | 85 | 100 | 200 | 1000 |
| F1.0 | × | 0.75 | ←  | | | → | 0.5 |
| F5.0 | × | ↕ | | | | | ↕ |
| F11.0 | × | 2.75 | ← | | | → | 2.5 |
| LARGER THAN F11.0 | × | × | × | × | × | × | × |

×: THRESHOLD THAT DOES NOT DETERMINE THAT SUBJECT HAS BEEN CHANGED

| | MACRO AREA (DEPTH OF FIELD OF LESS THAN 1.5 cm) | SUBJECT DISTANCE OF LESS THAN 3 m |
|---|---|---|
| THRESHOLD 2 | 6.0 (SET LARGER THAN NORMAL AREA) | PURSUANT TO ABOVE TABLE |
| THRESHOLD 3 | 0 | SET AT LESS THAN 1 m |

| | DETERMINATION | SPEED SETTING | RESPONSIVENESS SETTING | REMARKS |
|---|---|---|---|---|
| DEFAULT | FOCUSING IS BEING STOPPED | – | – | – |
| RACK FOCUS MODE | RESTART FLAG SUBJECT CHANGE FLAG | PURSUANT TO SETTING | PURSUANT TO SETTING | – |
| TRACKING MODE | MOVING SUBJECT DETERMINATION FLAG | CHANGE ACCORDING TO MOVING SUBJECT | DRIVE IMMEDIATELY | STOP FOR RESPONSE TIME IF SUBJECT HAS BEEN CHANGED |

LENS CONTROL APPARATUS AND CONTROL METHOD THEREOF

BACKGROUND OF THE INVENTION

Field of the Invention

The present disclosure relates to one or more embodiments of a lens control apparatus that controls the drive of a focus lens. Moreover, the present disclosure relates to one or more embodiments of a control method thereof.

Description of the Related Art

In the camera, focus detection in a phase difference detection system is conventionally and generally known which detects focus on the basis of a pair of image signals obtained by an imaging element receiving and photoelectrically converting a pair of light rays with parallax that has passed through a shooting optical system including a focus lens. In focus detection in the phase difference detection system, a method is general which determines whether or not a focus detection result is within a predetermined range based on the depth of focus to determine whether or not a subject is in focus.

In Japanese Patent Laid-Open No. 7-218818, the width of the predetermined range for determining whether or not to be in focus on the basis of the amount of defocus being a focus detection result is changed according to a mode that adjusts focus for a still subject and a mode that adjusts focus for a moving subject.

According to Japanese Patent Laid-Open No. 7-218818, the width of the predetermined range for determining whether or not to be in focus is changed according to whether a subject is still or moving to able to determine priority: the stability of the focus state or responsiveness. However, in Japanese Patent Laid-Open No. 7-218818, even if a subject is not still, when a focus detection result within the predetermined range has been detected, it is determined that the subject is in focus. If it has been determined that a moving subject is in focus, focus adjustment is temporarily stopped. Hence, a time lag occurs to detect the moving subject again and cause the focus lens to track the moving subject. Accordingly, blurring occurs during the time lag. Especially in a case of video shooting, the quality of the video is reduced if a change in the blurred state is conspicuous.

SUMMARY OF THE INVENTION

At least one object of the present disclosure is to provide one or more embodiments of a lens control apparatus that can improve the quality of an image upon tracking a moving subject as compared to the known technology. Moreover, another object is to provide one or more embodiments of a control method thereof.

The present disclosure includes at least one embodiment of a lens control apparatus including: a focus detection unit configured to detect an amount of defocus on a basis of a pair of image signals obtained by an imaging element receiving and photoelectrically converting a pair of light rays with parallax that has passed through a shooting optical system including a focus lens; a control unit configured to control drive of the focus lens; a moving subject determination unit configured to detect whether or not a subject is a moving subject; and a focus determination unit configured to determine whether or not the subject is in focus, on a basis of the amount of defocus detected by the focus detection unit, and is configured in such a manner that the control unit: determines that the subject is in focus in a first mode where the subject has not been determined by the moving subject determination unit to be a moving subject, based upon the amount of defocus being within a first range, and determines a focus state on a basis of the amount of defocus and a reversed state of a drive direction of the focus lens based on the amount of defocus, in a second mode where the subject has been determined by the moving subject determination unit to be a moving subject.

Moreover, as another aspect, the present disclosure includes at least a further embodiment of a lens control apparatus including: a focus detection unit configured to detect an amount of defocus on a basis of a pair of image signals obtained by an imaging element receiving and photoelectrically converting a pair of light rays with parallax that has passed through a shooting optical system including a focus lens; a control unit configured to control drive of the focus lens on a basis of a result of the focus detection unit; a change unit configured to change a response time of a transition from a focusing stop mode to a focus adjustment mode, the focusing stop mode in allowing the control unit to perform control in such a manner as to stop the drive of the focus lens upon a focus detection result being within a first range, the focus adjustment mode allowing the control unit to perform control in such a manner as to restart the drive of the focus lens upon the focus detection result not being within the first range; and a moving subject determination unit configured to determine a change in distance to a subject in an optical axis direction on a basis of the focus detection result, and is configured in such a manner that the control unit makes a transition to the focus adjustment mode irrespective of the response time upon the moving subject determination unit having determined that the subject is a moving subject, and does not make a transition to the focusing stop mode also upon the focus detection result having been determined to be within the first range.

According to other aspects of the present disclosure, one or more additional lens control apparatuses, one or more lens control methods, and one or more storage or recording mediums for use therewith are discussed herein. Further features of the present disclosure will become apparent from the following description of one or more exemplary embodiments (with reference to the attached drawings).

BRIEF DESCRIPTION OF THE DRAWINGS

FIGS. 9A and 9B are tables of thresholds used for moving subject determination in at least one embodiment.

DESCRIPTION OF THE EMBODIMENTS

An example of a mode for carrying out one or more embodiments of the present disclosure is described hereinafter with reference to the drawings. The embodiment described below is an example as means for realizing one or more aspects of the present invention. The configuration of an apparatus to which the present disclosure is applied and various conditions may be modified or changed as appropriate within the scope of the intention of the present invention.

First Embodiment

[Configurations of the Lens 10 and the Camera 20]

Figure 1:
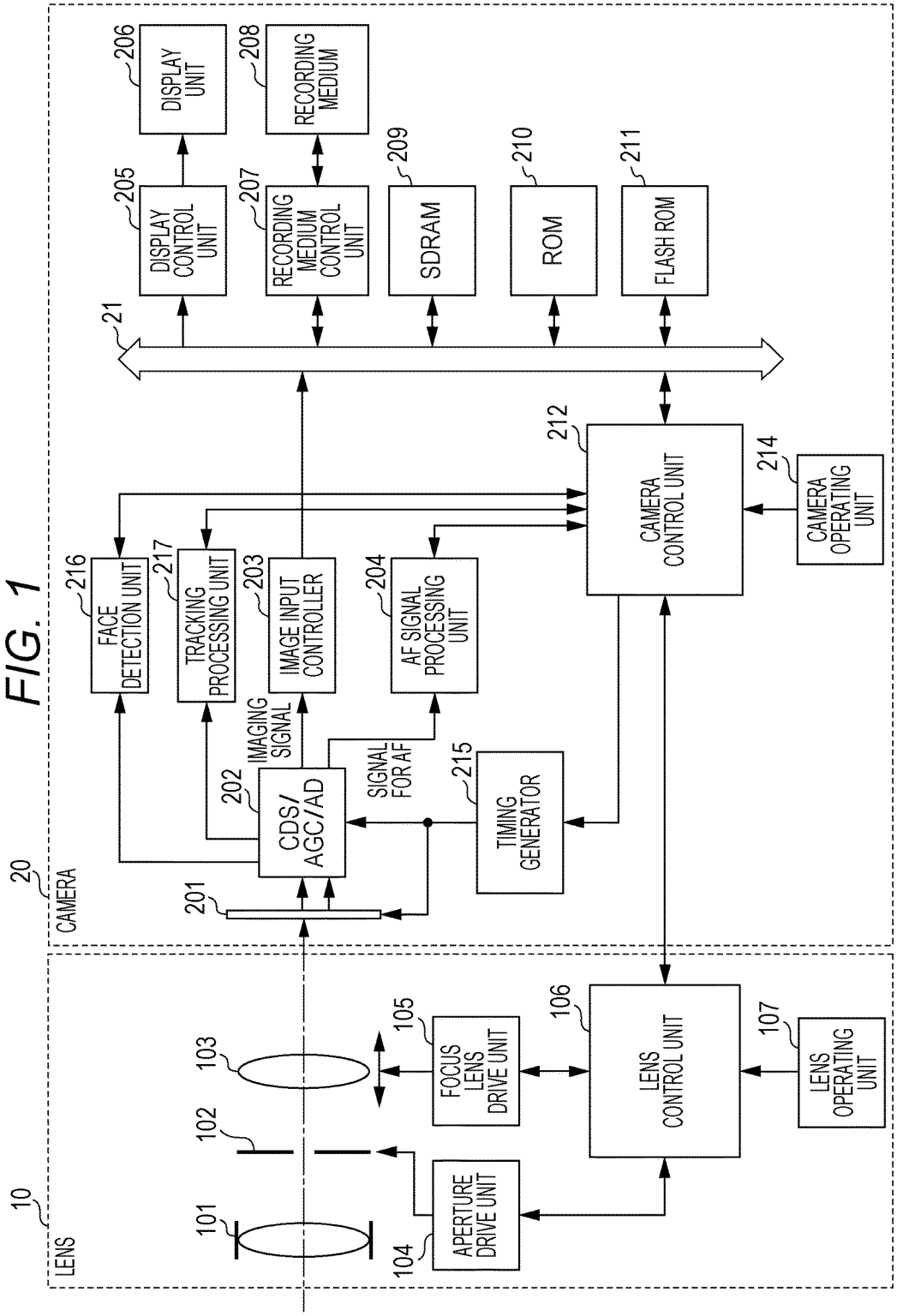
FIG. 1 is a block diagram illustrating the configurations of a camera and a lens in at least one embodiment.

FIG. 1 is a block diagram illustrating the configurations of a lens and a main body of an interchangeable-lens camera in a first embodiment of the disclosure.

As illustrated in FIG. 1, the embodiment is configured including a lens 10 and a camera 20. A lens control unit 106 that controls the overall operation of the lens communicates information with a camera control unit 212 that controls the operation of the entire camera.

Firstly, the configuration of the lens 10 is described. The lens 10 includes a fixed lens 101, a aperture 102, a focus lens 103, a aperture drive unit 104, a focus lens drive unit 105, a lens control unit 106, and a lens operating unit 107. The fixed lens 101, the aperture 102, and the focus lens 103 are a shooting optical system of the embodiment. The aperture 102 is driven by the aperture drive unit 104. The lens control unit 106 controls the aperture 102 via the aperture drive unit 104 to control the amount of light incident on an imaging element 201 described below. The focus lens 103 is driven by the focus lens drive unit 105. The lens control unit 106 controls the position of the focus lens 103 via the focus lens drive unit 105 to control the position of focus of an image formed on the imaging element 201 described below. When a user performs an operation via the lens operating unit 107, the lens control unit 106 performs control in accordance with the user operation. The lens control unit 106 controls the aperture drive unit 104 and the focus lens drive unit 105 in accordance with a control command/control information received from the camera control unit 212 described below. Moreover, the lens control unit 106 transmits lens control information to the camera control unit 212.

Next, the configuration of the camera 20 is described. The camera 20 is configured in such a manner as to be able to acquire an imaging signal from light rays that have passed through the shooting optical system of the lens 10.

The imaging element 201 is configured by a CCD or CMOS sensor. The light rays that have passed through the shooting optical system forms an image on a light receiving surface of the imaging element 201 to be photoelectrically converted by photodiodes into signal charge in accordance with the amount of incident light. The signal charge accumulated in each photodiode is sequentially read, as a voltage signal in accordance with the signal charge, from the imaging element 201 on the basis of a driving pulse given from a timing generator 215 in accordance with a command of the camera control unit 212.

Figure 2:
FIG. 2 is a diagram describing a pixel configuration of an image plane phase difference detection system in at least one embodiment.

The imaging element 201 includes two photodiodes in one pixel portion to perform focus detection in an image plane phase difference detection system (FIG. 2). It is designed in such a manner that light rays are separated by a microlens (not illustrated), and the light rays having parallax are received by the two photodiodes to remove two signals for imaging and AF. A signal (A+B) obtained by adding the signals of the two photodiodes is an imaging signal. The photodiode signals (A and B) are two (a pair of) image signals for AF. A correlation between the two image signals is calculated by an AF signal processing unit 204 described below, on the basis of the signals for AF, to calculate the amount of image displacement and various kinds of reliability information.

The imaging signal and the signals for AF read from the imaging element 201 are inputted into a CDS/AGC/AD converter 202 to perform correlated double sampling to remove reset noise, gain adjustment, and signal digitization. The CDS/AGC/AD converter 202 outputs the imaging signal to an image input controller 203 and the signals for AF to the AF signal processing unit 204.

The image input controller 203 stores, in an SDRAM 209, the imaging signal outputted from the CDS/AGC/AD converter 202. The imaging signal stored in the SDRAM 209 is displayed on a display unit 206 by a display control unit 205 via a bus 21. Moreover, when in mode for recording an imaging signal, the imaging signal is recorded by a recording medium control unit 207 in a recording medium 208. Moreover, a control program to be executed by the camera control unit 212, various kinds of data necessary for control, and the like are stored in a ROM 210 connected via the bus 21. Various kinds of setting information related to the operation of the camera 20, such as user setting information, and the like are stored in a flash ROM 211.

The AF signal processing unit 204 calculates a correlation on the basis of the two image signals for AF outputted from the CDS/AGC/AD converter 202, and calculates the amount of image displacement and reliability information (such as a two-image matching level, two-image steepness, contrast information, saturation information, and defect information). The calculated amount of image displacement and reliability information are outputted to the camera control unit 212. Moreover, the camera control unit 212 notifies the AF signal processing unit 204 of changes in settings for calculating them on the basis of the acquired amount of image displacement and reliability information. For example, if the amount of image displacement is large, an area for which a correlation is calculated is set large, or the kind of band-pass filter is changed according to the contrast information.

A face detection unit 216 performs a known face detection process on the imaging signal to detect the face of a person on a shooting screen. The detection result is transmitted to the camera control unit 212. The camera control unit 212 transmits information to the AF signal processing unit 204 in such a manner as to add a face frame to an area including the face on the shooting screen on the basis of the detection result. There is a main face determination processing unit that determines the order of priority according to face positions and sizes, or at the user's instruction, when the face detection unit has detected faces of a plurality of persons. The face that has been judged by the main face determination processing unit to have the highest priority is assumed to be the prime face. For example, a determination is made in such a manner as to give the highest priority to a face selected by the user's instruction, and then give a higher priority as the position of a face is closer to the center of the screen and as the size of a face is larger. However, as long as it is possible to detect faces and determine the prime face, the method is not limited to the above method.

For example, the following method has been disclosed as the face detection process. It is a method in which a skin color area is detected from gradation colors of pixels presented in image data to detect a face on the basis of a matching level with a face contour plate that has been prepared in advance, or a method in which features of the face such as the eyes, nose, and mouth are extracted using a known pattern recognition technique to detect a face. In the embodiment, the method for the face detection process is not limited to the above-mentioned methods, and can be any method.

A tracking processing unit 217 acquires images having different times from the imaging signals outputted from the CDS/AGC/AD converter 202, extracts features in the images, and searches for and tracks an area where the features are similar. Upon an initial operation where a reference image has not been registered, a partial area within the image is set as the reference image on the basis of information of the camera operating unit 214 and information on the detection result of the face detection unit 216. Color information is then extracted from the reference image to be registered as a feature of a subject to track. The matching process between the image of the imaging signal and the reference image in the current frame is performed on the basis of the extracted features of the tracking target subject. In each image, an area, which has the highest degree of correlation with the reference image, of the image of the imaging signal in the current frame is extracted by the matching process as a target specific area. It is then determined whether or not to continue tracking, depending on whether or not the degree of correlation is high. Moreover, the tracking state based on the degree of correlation is calculated as reliability, is transmitted to the camera control unit 212, and is used as a parameter for AF control.

The camera control unit 212 exchanges information with the entire inside of the camera 20 to perform control. The camera control unit 212 not only performs processing in the camera 20 but also executes various camera functions operated by the user, such as turning-on/off of the power, setting changes, start of recording, start of AF control, and checking of recorded video, in accordance with an input from the camera operating unit 214. Moreover, as described above, the camera control unit 212 exchanges information with the lens control unit 106 in the lens 10, transmits a lens control command/control information, and acquires lens internal information.

In addition, the camera 20 includes the recording medium 208 and the SDRAM 209.

[The Video Shooting Process]

Next, a video shooting process in the camera 20 of the embodiment is described with reference to FIG. 3.

In the embodiment, a video recording switch is pressed to start and stop recording video. However, the recording may be started and stopped by another system such as a changeover switch.

When it is instructed with the video recording switch or the like to record video, the AF signal processing unit 204 performs an AF area calculation process in S505. Execution then proceeds to S506. The AF area calculation process is a process of setting an area on the image plane to acquire a signal used for focus detection.

The AF signal processing unit 204 performs a focus detection process in S506. Execution then proceeds to S507. In the focus detection process, the amount of defocus and the reliability information are acquired by focus detection in the image plane phase difference detection system. The amount of defocus is detected on the basis of the amount of image displacement based on the above-mentioned pair of image signals. The amount of defocus in the embodiment is information indicating how much the focus lens 103 is controlled to be driven in which of the closest distance direction and the infinite distance direction. The reliability information is an index that indicates how reliable the amount of image displacement is. Reliability can be defined by the steepness and a matching level fnclvl of two images of the image signals A and B (hereinafter referred to as the two-image matching level). The focus detection process of the image plane phase difference method is described in detail in, for example, Japanese Patent Laid-Open No. 2015-87704.

S507 is a process of the camera control unit 212 referring to the responsiveness setting and speed setting of the focus lens 103 set by the user to control the drive of the focus lens 103.

The user can set the speed by selecting the drive speed of the focus lens 103 on, for example, a menu screen (not illustrated) of the camera. As an example of the speed setting of the embodiment, the drive speed is selected from seven levels of +2 to −4. The camera control unit 212 refers to a speed parameter corresponding to the drive speed selected by the user to set the drive speed of the focus lens 103 using the amount of defocus detected by the AF signal processing unit 204. As an example in the embodiment, the speed parameter is the count of the vertical synchronization signals (60 Hz). The speed can be calculated by the following equation:

$$\text{The set speed [mm/s]} = \text{the amount of defocus [mm]} \div \text{the speed parameter} \times \tfrac{1}{60}\ [s] \quad (1).$$

Consequently, the speed is changed according to the setting.

Also in terms of the responsiveness setting, the user can select the responsiveness of the drive of the focus lens 103 for shooting on, for example, a menu screen (not illustrated) of the camera. Responsiveness is a measure of the response speed of the drive of the focus lens 103. One of the indexes indicating responsiveness is the length of the response time being the time required to drive the focus lens 103. As the response time is increased, responsiveness is reduced. As the response time is reduced, responsiveness is increased. As an example of the responsiveness setting of the embodiment, responsiveness is selected from seven levels of +3 to −3. The camera control unit 212 refers to the response time of the focus lens 103 corresponding to the responsiveness selected by the user, and changes the time required to restart in S512 and the time required to start focusing when the subject has been switched in a tracking drive mode in S516.

The camera control unit 212 performs a moving subject determination process in S508. The moving subject determination process is a process of the camera control unit 212 determining whether or not the subject that is being shot is moving in an optical axis direction. The details are described below with reference to FIGS. 8 and 9A and 9B S509 is a process of the camera control unit 212 determining whether or not the subject has been changed. The details are described below with reference to FIGS. 10 and 11A to 11C.

S510 is a process of the camera control unit 212 determining a focus mode to be set. The details are described below with reference to FIGS. 12 and 13A and 13B.

In S511, the camera control unit 212 determines whether or not the focus mode determined in S510 is default. If the focus mode is default, execution moves to S512.

S512 is a process of AF restart determination performed by the camera control unit 212. The details are described below with reference to FIG. 4.

If the focus mode is not default in S511, execution moves to S513.

If the camera control unit 212 determines in S513 that the focus mode is a rack focus mode, execution moves to S514.

In S514, the camera control unit 212 performs control in such a manner as to perform an AF process in rack focus mode. The details are described below with reference to FIG. 5.

If the focus mode is not the rack focus mode in S513, execution moves to S515.

Figure 10:
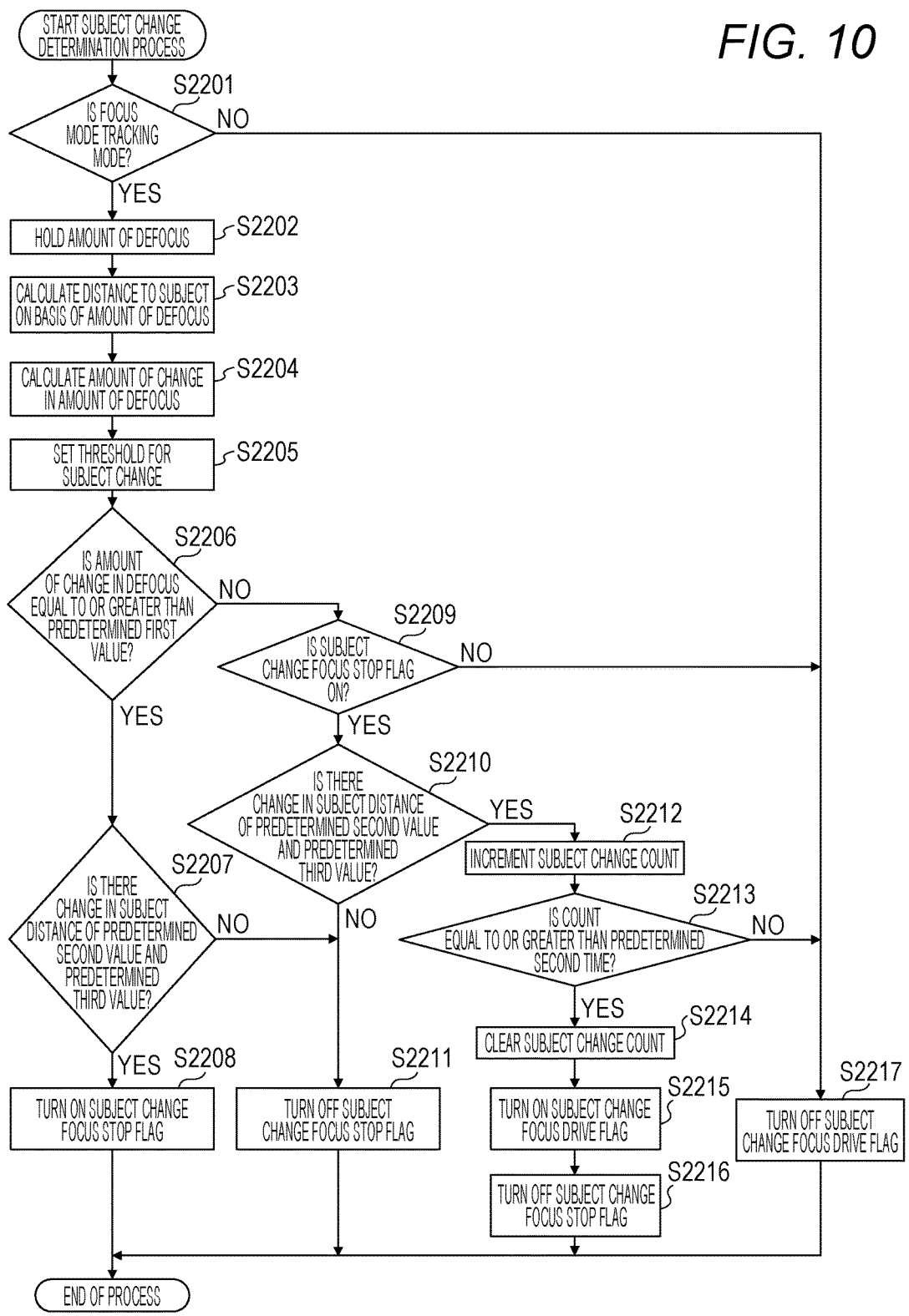
FIG. 10 is a flowchart illustrating a subject change determination method in at least one embodiment.

In S515, the camera control unit 212 determines the presence or absence of a subject change focus stop flag (described below in FIG. 10). If the flag is off, execution moves to S516. If the flag is not off, execution moves to S517.

In S517, the camera control unit 212 performs control in such a manner as to stop the lens without performing the AF process. In this manner, the subject change focus stop flag is referred to. Accordingly, when it is determined whether or not the subject has been switched to another subject, the camera control unit can perform control in such a manner as to stop the drive of the focus lens 103. In S516, the AF process in tracking mode is performed. The details are described below with reference to FIG. 14.

This flow is repeatedly executed until an instruction to stop video shooting is issued.

[Overviews of the Focus Modes]

Figures 13A, 13B:
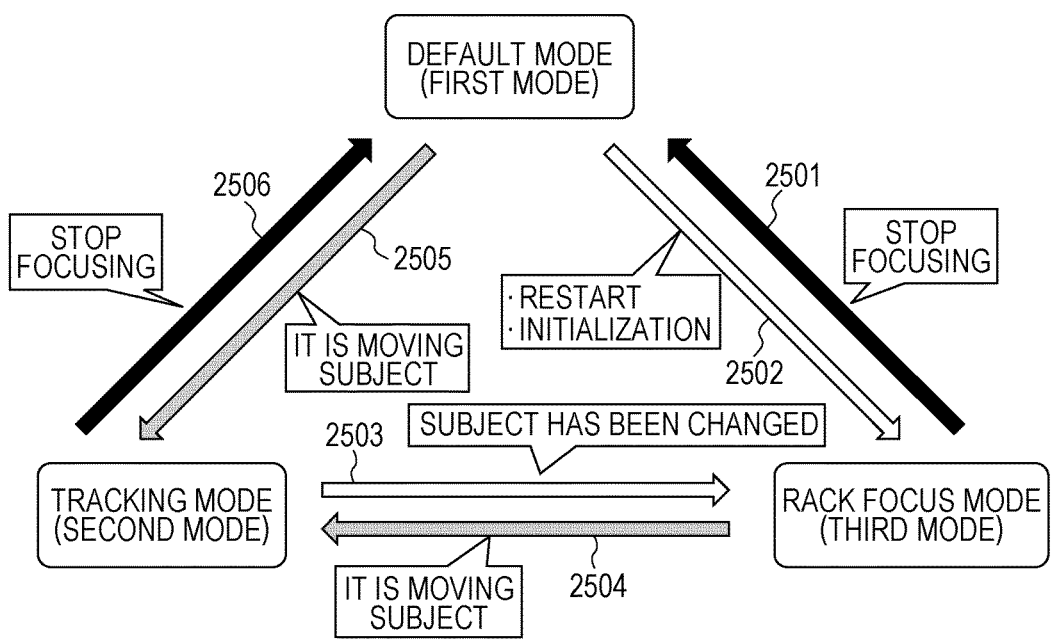
FIGS. 13A and 13B are diagrams related to the focus mode in at least one embodiment.

An overview of each focus mode of the embodiment is described with reference to FIGS. 13A and 13B before each sub-flow is described. The focus mode of the embodiment is broadly divided into three modes: "default mode," "rack focus mode," and "tracking mode." FIG. 13A is a diagram illustrating the relationship between the focus modes. FIG. 13B is a diagram illustrating the kinds of focus mode and their characteristics.

The characteristics of the focus modes are briefly described. The default mode (first mode, focusing stop mode) is a mode to which a transition is made from another focus mode at the time of stopping focusing (when it is determined to have achieved focus and the drive of the focus lens 103 is stopped).

The rack focus mode (third mode) is a mode to set the response time and drive speed for driving the focus lens 103, as instructed by the user, and drive the focus lens 103 in accordance with the settings. If there is no user's instruction, the camera control unit 212 performs control in such a manner as to drive the focus lens 103 in accordance with the default settings.

The tracking mode (second mode, focus adjustment mode) is a focus mode to perform control in such a manner as to cause the focus lens 103 to track a moving subject when the moving subject has been detected as a subject. Accordingly, the drive speed of the focus lens 103 is set at a speed in accordance with the moving subject. In the embodiment, as an example of the drive control of the focus lens 103 in accordance with a moving subject, the camera control unit 212 variably controls the drive speed of the focus lens on the basis of the detected amount of defocus. The camera control unit 212 performs control in such a manner as to drive the focus lens faster if the detected amount of defocus is relatively larger than if the detected amount of defocus is smaller.

The transition of the focus modes is described with reference to FIG. 13A. If it is determined by moving subject determination in default mode that a subject is a moving subject, a transition is made to the tracking mode (2505). Moreover, also if it is determined by the moving subject determination in rack focus mode that a subject is a moving subject, a transition is made to the tracking mode (2504).

If it is determined by a subject change determination process in tracking mode that a subject had been changed, a transition is made to the rack focus mode (2503).

If it is determined by the moving subject determination that a subject is not a moving subject, and if it is determined that the subject has been switched (changed) by the subject change determination, a transition is made from the default mode to the rack focus mode (2502).

If it is determined in rack focus mode or tracking mode to have achieved focus, a transition is made to the default mode (2501, 2506).

[The Moving Subject Determination Process]

Figure 8:
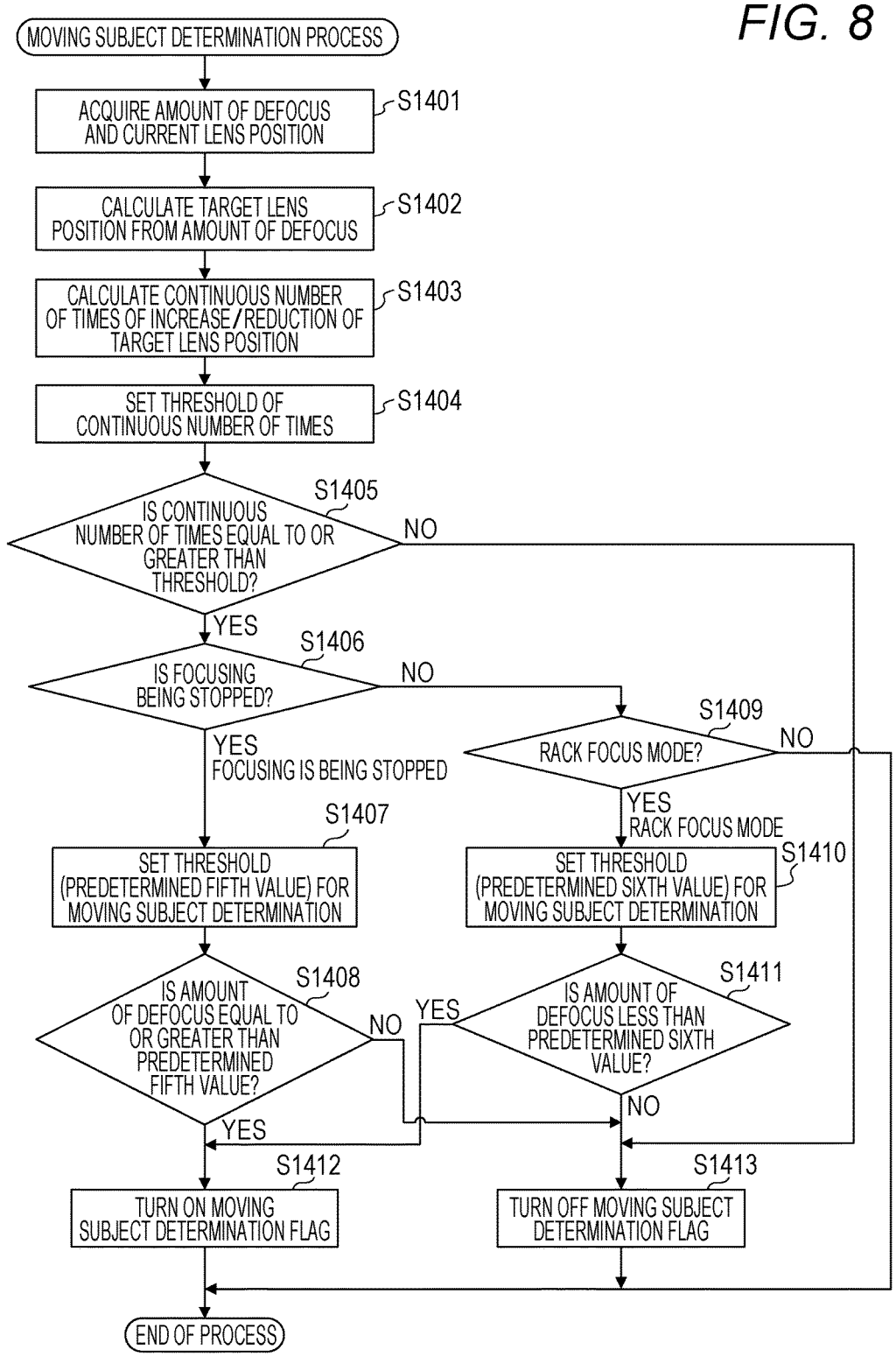
FIG. 8 is a flowchart illustrating a moving subject determination method in at least one embodiment.

Next, the moving subject determination process of S508 is described with reference to FIG. 8. In S1401, the camera control unit 212 acquires the amount of defocus calculated in S506. Moreover, the camera control unit 212 acquires the current lens position of the focus lens 103 via the lens control unit 106.

In S1402, a target lens position is calculated from the amount of defocus and the current lens position that are acquired in S1401. The following equations are used for this calculation:

The drive amount [pulses]=the amount of defocus [mm]÷a pulse conversion coefficient [pulses/mm]   (2), and The target lens position [pulses]=the current lens position [pulses]+the drive amount [pulses]   (3).

This calculation is an example of the conversion of an out-of-focus amount (here, the amount of defocus) on the image plane of the imaging element 201 into the lens drive amount of the focus lens 103. As long as the target lens position of the focus lens 103 can be calculated, any calculation method other than the above calculation can be accepted.

Even if a subject position and the position of the focus lens 103 are the same, a variation occurs in the amount of defocus calculated, depending on the shooting condition. Hence, two values, a defocus value as an actual value calculated and an average of the amounts of defocus obtained from three calculations, are prepared to calculate the target lens position of the focus lens 103. Moreover, two patterns, one calculated using the actual value and one calculated using the average, of the target lens position of the focus lens 103 are calculated.

In S1403, the camera control unit 212 detects the continuity of the target lens position (the actual value/the average) of the focus lens 103 in the infinite distance direction or closest distance direction. In the embodiment, let the direction toward the infinite end be a plus direction, and let the direction toward the closest end be a minus direction.

How many times it is continuously increased/reduced in the infinite distance direction/closest distance direction is counted.

S1404 is a process of setting a threshold of the continuous number of times. As the embodiment illustrates an example in FIG. 9A, the threshold is changed according to the aperture and the kind of value used for the calculation of the target lens position (the actual value/the average).

As illustrated in FIG. 9A, in S1404, as the f-number is reduced, the threshold is reduced as compared to one at a large f-number. This is because the depth of focus becomes shallower if the f-number is small than if the f-number is large; therefore, a blur becomes conspicuous. The easiness to start the moving subject determination allows a reduction in the occurrence of unnatural blurring. Accordingly, the quality of video can be maintained. Moreover, the threshold is made larger if the amount of defocus used for the calculation of the target lens position of the focus lens 103 is the actual value than if the average is used. This is because more stable detection can be achieved if the average is used than if the actual value is used. If the f-number is larger than F11, the moving subject determination is not made. This is because the depth of focus of the subject is sufficiently deep; therefore, even if the moving subject determination is not made, blurring hardly occurs. If, for example, the f-number is larger than F11, the threshold is set in such a manner that the continuous number of times is not equal to or greater than the threshold.

S1405 is a process of determining whether or not the continuous number of times has exceeded the threshold. If the continuous number of times has exceeded the threshold, execution proceeds to S1406. If not, execution proceeds to S1413. In the embodiment, if at least one of the target lens position calculated using the actual value and the target lens position calculated using the average is equal to or greater than its threshold set in S1404, it is determined that the subject is a moving subject. Execution then proceeds to S1406. If both of the target lens position calculated using the actual value and the target lens position calculated using the average are less than their thresholds set in S1404, it is determined that the subject is not a moving subject. Execution then proceeds to S1413.

In S1406, it is determined whether or not focusing is being stopped (in other words, whether or not it is in default mode). If focusing is being stopped, execution proceeds to S1407. If not, execution proceeds to S1409.

In S1409, it is determined whether or not the focus mode is the rack focus mode. If it is the rack focus mode, execution proceeds to S1410. If not, the focus mode is the tracking mode. Therefore, the process of this flow is terminated to continue the tracking mode.

The camera control unit 212 performs control in S1407 in such a manner as to set a predetermined fifth value as the threshold for the moving subject determination, and performs control in S1410 in such a manner as to set a predetermined sixth value as the threshold for the moving subject determination.

In the embodiment, in the case where focusing is being stopped, the threshold (here, the predetermined fifth value) is changed according to the aperture and the focal length as illustrated in an example in FIG. 9B. For example, as illustrated in the example in FIG. 9B, the predetermined fifth value is reduced if the f-number is small as compared to if the f-number is large. Moreover, the predetermined fifth value is increased if the focal length is long as compared to if the focal length is short. This is because as the depth of focus becomes shallower, a blur becomes more conspicuous; accordingly, it becomes easier to make the moving subject determination to maintain the quality of video. As the predetermined fifth value is reduced, the moving subject determination can be made more quickly when a moving subject moves (responsiveness to a subject of the focus lens 103 is improved). On the other hand, there also arises a case where the moving subject determination is made for a subject that is not a moving subject (the tracking stability of the focus lens 103 for a subject is reduced). Hence, it is required to set the predetermined fifth value, considering the balance between stability and responsiveness.

Moreover, in the example of FIG. 9B, the f-numbers and focal lengths at which the moving subject determination is not made are set. As an example in FIG. 9B, a case where the f-number is larger than F11 and a case where the focal length is equal to or less than 24 mm, the moving subject determination is not made. This is because the depth of focus of the subject is sufficiently deep; therefore, blurring hardly occurs even if the moving subject determination is not made. Hence, in the case where the f-number is larger than F11, and in the case where the focal length is equal to or less than 24 mm, the predetermined fifth value is set in such a manner as to avoid the amount of defocus increasing to or above the predetermined fifth value.

The effects of setting the predetermined sixth value in S1410 for the moving subject determination in rack focus mode are described. In a case, for example, where a moving subject is detected at a timing when a subject to be focused on is still out of focus, if the rack focus mode is immediately switched to the tracking mode, the drive speed of the focus lens 103 changes suddenly, and the blurred state also changes suddenly, which results in a reduction in the quality of video. Hence, in the embodiment, in a case where a moving subject is detected in rack focus mode, if the position of the focus lens 103 for a subject to be focused on is near the focus position, the camera control unit 212 performs control in such a manner as to make a transition from the rack focus mode to the tracking mode. In other words, at less than the predetermined sixth value, it is determined that the focus lens 103 has reached a position where a target subject is in focus. The camera control unit 212 then performs control in such a manner as to make a transition from the rack focus mode to the tracking mode. Consequently, strangeness resulting from the change of the blurred state with the changing drive speed of the focus lens associated with the switching from the rack focus mode to the tracking mode is reduced. Accordingly, the quality of video can be maintained. Also in terms of the predetermined sixth value, the predetermined sixth value is set at a smaller value if the f-number is small than if the f-number is large, as with the predetermined fifth value. Moreover, the predetermined sixth value is set at a larger value if the focal length is long than if the focal length is short.

Furthermore, in the case of the rack focus mode, the threshold is changed according to whether or not the moving direction of the subject and the drive direction of the focus lens 103 agree with each other. If the moving direction of the subject and the drive direction of the focus lens 103 do not agree with each other, the subject and the focus lens 103 moves/is driven in opposing directions in the optical axis direction. In this case, both of the focus lens 103 and the subject continue moving, the time required for the focus lens 103 to go within the focus range of the subject becomes very short. Accordingly, the time required to switch from the rack focus mode to the tracking mode may be too short. Therefore, if the moving direction of the subject and the drive direction of the focus lens 103 do not agree with each other, the predetermined sixth value is set large to secure the switching timing. On the other hand, if the moving direction of the subject and the drive direction of the focus lens 103 agree with each other, the determination is made with the same threshold as the one for the normal focusing stop. In terms of the threshold, one obtained by multiplying the threshold determined in FIG. 9B by a designated magnification is set as the threshold of the rack focus mode. In the case of the embodiment, as an example, a coefficient of a factor of 1.5 is multiplied if the lens and the subject move in opposite directions.

In S1408, whether or not the amount of defocus is equal to or greater than the predetermined fifth value is determined. If the amount of defocus is equal to or greater than the predetermined fifth value, execution proceeds to S1412. If not, execution proceeds to S1413.

In S1411, whether or not the amount of defocus is less than the predetermined sixth value is determined. If the amount of defocus is less than the predetermined sixth value, execution proceeds to S1412. If not, execution proceeds to S1413.

S1412 is a process of a case where a subject has been determined to be a moving subject (the moving subject determination has been made). A moving subject determination flag is turned on to terminate the process. In a case where a moving subject has been detected in rack focus mode, if the amount of defocus is increased to or above the predetermined sixth value in S1411, that is, if it is determined that the subject has come into focus, the moving subject determination flag is turned on in S1412. The turning-on of the moving subject flag makes a transition to the tracking mode in a focus mode determination process (FIG. 12) described below. In this manner, after it is determined to have achieved focus, a transition is made to the tracking mode (the mode where the focus lens 103 is controlled in such a manner as to track the moving subject at a speed in accordance with the moving speed of the subject). Accordingly, the camera control unit 212 can perform control in such a manner as to prevent a sudden change in the blurred state. Consequently, the quality of an image can be improved when a moving subject is tracked.

On the other hand, S1413 is a process for the time when the moving subject determination has not been made, or for the case where a transition has already been made to the tracking mode. The moving subject determination flag is turned off to terminate the process. The moving subject determination flag is turned off here to continue driving the focus lens 103 in rack focus mode in the focus mode determination process (FIG. 12) described below. Consequently, the camera control unit 212 can perform control in such a manner as to prevent a sudden change in focus state due to the switching of the focus state that is an out-of-focus state to the tracking mode.

[The Subject Change Determination Process]

Next, the subject change determination process of S509 is described with reference to FIG. 10. The subject change determination process is a process of determining whether or not a subject to track has been changed in tracking mode.

The reason why the determination of whether or not a subject has been changed is made only in tracking mode in this flow is described here. For example, a case is conceivable where when the camera control unit 212 performs control in such a manner as to perform focus detection on a certain subject and cause the focus lens 103 to track the subject, a subject different from the subject crosses between the camera 20 and the subject tracked by the focus lens. In this case, if the camera control unit 212 controls the drive of the focus lens 103 in such a manner as to cause the focus lens 103 to track the crossing subject, it becomes impossible to cause the focus lens 103 to track the original tracking target subject. If the focus lens 103 is caused to track the subject who crosses unintentionally, the quality of video ends up decreasing. Hence, in the embodiment, the subject change determination process of determining whether or not a subject is a subject that is an original tracking target is performed in tracking mode; accordingly, the focus lens 103 is prevented from tracking a subject different from a tracking target subject. If, for example, a subject different from the tracking target subject crosses, the camera control unit 212 performs control in such a manner that the drive of the focus lens 103 is stopped not to perform the tracking operation on the crossing subject. The details are described below. On the other hand, even if a subject different from a subject that is an original tracking target is captured, when it can be determined that a user has changed the subject intentionally, the camera control unit 212 controls the drive in such a manner as to cause the focus lens 103 to track the crossing subject. The flow of FIG. 10 is described below as an example of the flow that achieves the control.

S2201 is a process of determining whether or not the current focus mode is the tracking mode. If the current focus mode is the tracking mode, the camera control unit 212 performs control in such a manner as to proceed to S2202 to determine the change of the subject. If the current focus mode is not the tracking mode, the camera control unit 212 performs control in such a manner as to proceed to S2217 and terminate the process of the flow.

S2202 is a process of storing the amount of defocus in the SDRAM 209.

In S2203, the camera control unit 212 calculates a distance between the focus and the subject on the basis of the amount of defocus calculated by the AF signal processing unit 204 in S506. The following equation is used for the calculation:

Distance between the focus and the subject=the amount of defocus×the square of subject distance÷(the square of the focal length+the amount of defocus×subject distance)     (4)

In the embodiment, the distance between the focus and the subject is one obtained by converting the amount of defocus into a distance on the subject side that indicates how far apart a subject position where the subject is in focus and an actual subject position are. Moreover, the subject distance is a distance from the subject position where the subject is in focus to the focus lens 103.

S2204 is a process of calculating the amount of change between the amount of defocus calculated this time and the amount of defocus calculated last time. This is for detecting a large change in subject, and can be obtained using the following equation:

The amount of change in the amount of defocus DEF_Diff_NOW=the previous amount of defocus−the present amount of defocus     (5).

S2205 is a process of the camera control unit 212 setting thresholds for determining whether or not to have changed a subject. There are three thresholds.

Threshold 1 (a predetermined first value): a threshold for the amount of change in the amount of defocus Threshold 2 (a predetermined second value): a threshold for the ratio of the distance between the focus and the subject to the depth of field Threshold 3 (a predetermined third value): a threshold for the distance between the focus and the subject Threshold 1 is a threshold for the amount of change between the amount of defocus detected this time and the amount of defocus detected last time. This is a threshold used to detect a sudden change in subject. As an example in the embodiment, threshold 1 is obtained by comparing an average DEF_Diff_AVE of three amounts of change in the amount of defocus and the present amount of change in the amount of defocus, DEF_Diff.

In other words, when the following equation holds, then it can be determined that a sudden change has occurred in subject.

$$DEF\_Diff\_NOW > DEF\_Diff\_AVE * threshold\ 1 \qquad (6)$$

As an example, threshold 1 of the embodiment is a threshold of a factor of 1.5 or more. This is because it is conceivable that when the amount of defocus changes by a factor of 1.5, the subject is highly likely to have been changed.

Threshold 2 is a threshold for the ratio of the distance between the focus and the subject to the depth of field, and is a threshold for determining how much is blurred. A multiple of the depth of field is set as threshold 2. As an example in the embodiment, the threshold is changed according to the depth of focus as in FIG. 11A. As the f-number is reduced, the depth of focus is increased. Accordingly, a variation in the focus detection result becomes easy to occur. As the depth of focus is increased, threshold 2 is increased as compared to a case where the depth of focus is not deep. Accordingly, it is possible to prevent an erroneous determination resulting from the variation in the focus detection result. When a change of two or more times the depth of field is occurring in the distance between the focus and the subject, it indicates that it is highly likely that the subject has been changed. If the depth of field is deep enough so that the blurred state does not change even if the focus lens 103 is caused to track whichever, the subject that is an original tracking target or the subject crossing in between with the camera 20, the subject change determination may not be made. For example, as an example of the embodiment, if the f-number is larger than F11, the threshold may be set in such a manner that the subject change determination is not made. In this case, for example, the threshold is set in such a manner that the ratio of the distance between the focus and the subject to the depth of field does not exceed the threshold.

Threshold 3 is a threshold for the distance between the focus and the subject, and is a threshold for detecting how far apart the focus and the subject are. In the case of the embodiment, a distance of 1 m between the focus and the subject is set as the threshold as an example. This indicates that if a subject that is 1 m or more apart from a subject tracked is detected, the subject has been changed. If threshold 3 is increased, trackability for the subject that is the original tracking target is improved. However, it becomes difficult to determine the change of the subject. In other words, the possibility of being able to avoid performing the focusing operation on a subject crossing between a subject being an original tracking target and a camera (also referred to as the crossing subject) during the shooting of a moving subject is increased. On the other hand, if threshold 3 is reduced, it becomes easy to determine that the subject has been changed from the subject that is the original tracking target. The possibility of being able to avoid performing the focusing operation on a subject crossing between a subject being an original tracking target and a camera (also referred to as the crossing subject) during the shooting of the moving subject is increased. On the other hand, the trackability of the focus lens 103 for a moving subject ends up decreasing.

If the moving speed of a subject is known beforehand, threshold 3 of the distance between the focus and the subject is changed according to the moving speed. Accordingly, the presence or absence of the change of the subject can be determined with higher accuracy. For example, threshold 3 is set larger if the moving speed of the subject is high than if the moving speed of the subject is low. Accordingly, it is possible to prevent determining erroneously that the subject has been changed although capturing the same subject. Threshold 3 is set smaller if the moving speed of the subject is low than if the moving speed is high. Accordingly, if the subject has been changed, it becomes easy to track the changed subject.

The relationship between thresholds 2 and 3 described above is described with reference to FIG. 11C.

Figures 11A, 11B, 11C:
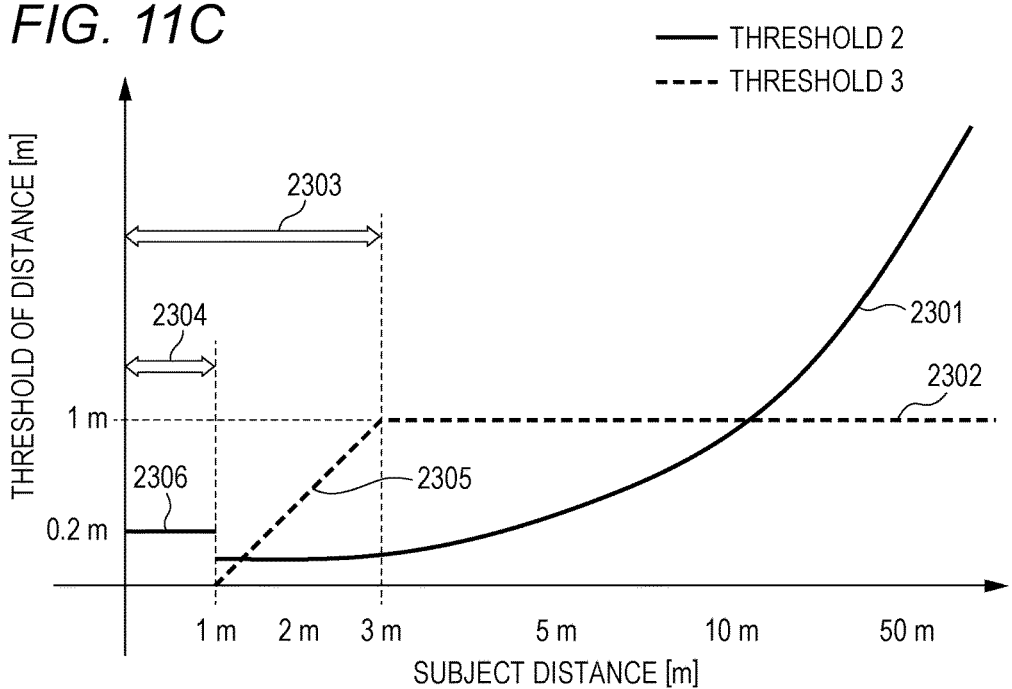
FIGS. 11A to 11C are tables of thresholds used for subject change determination in at least one embodiment.

In FIG. 11C, threshold 2 is indicated by a line 2301. Threshold 3 is indicated by a line 2302 (1 m in the embodiment). Threshold 3 is the threshold for a change in distance to a subject and accordingly is fixed irrespective of the subject distance. However, if the depth of field is increased, a variation occurs in the focus detection result. Hence, a variation of 1 m or more occurs in a case of a subject at a long range. Therefore, both of thresholds 2 and 3 are also used for a subject at a long range to determine the change of the subject with accuracy.

Threshold 2 is the threshold related to the depth of field and therefore changes according to the subject distance. Threshold 2 changes as indicated by the line 2301, and is increased on the long range side, and is reduced on the short range side. Hence, in terms of a subject at a long range, even if the distance between the focus and the subject is equal to or greater than threshold 3, when the ratio of the distance between the focus and the subject to the depth of field is less than threshold 2, the camera control unit 212 determines that the subject has not been changed. Consequently, it is possible to prevent an erroneous determination resulting from a variation in the focus detection result.

On the other hand, the depth of field used for threshold 2 is reduced on the short range side. If only threshold 2 is set, the threshold becomes too small for the movements of the subject. Hence, threshold 3 is used on the short range side to enable the prevention of an erroneous determination.

In other words, when the conditions of thresholds 2 and 3 are exceeded, it is judged that the subject has been changed. Accordingly, the presence or absence of a change in subject can be stably determined both at the long range and the short range.

Furthermore, as indicated by areas 2303 and 2304, the thresholds may be changed in areas where the subject distance is shorter than a predetermined distance. A description is given with reference to FIG. 11B.

Firstly, the area 2303 indicates a subject distance of less than 3 m (less than a predetermined seventh value) as an example in the embodiment. At less than the distance, the camera-to-subject distance is short and there is little influence of crossing. Moreover, the resolution/accuracy of distance information acquired from the lens is high. The distance to the subject is reliable. From these reasons, the condition of threshold 3 may be changed between a case where the subject distance is equal to or greater than the predetermined seventh value and a case where the subject distance is less than the predetermined seventh value. In this case, if the subject distance is equal to or greater than the predetermined seventh value, threshold 3 is set at a fixed value irrespective of the subject distance. If the subject distance is less than the predetermined seventh value, threshold 3 is set at a value smaller than if the subject distance is equal to or greater than the predetermined seventh value. Moreover, the camera control unit 212 sets the threshold in such a manner that threshold 3 is increasingly reduced (but not to zero) from a subject distance of 3 m (the predetermined seventh value) to (a predetermined eighth value) as indicated by a line 2305. Moreover, at a subject distance of less than 1 m (less than the predetermined eighth value), it is set in such a manner that threshold 3 is zero at a subject distance of 1 m.

Moreover, the area 2304 indicates a macro-shooting area at a subject distance of 1 m (less than the predetermined eighth value). For example, a depth of field of less than 1.5 cm (less than a predetermined tenth value) conditions a determination in this area in the embodiment. In the macro-shooting area 2304, the change of a subject cannot be detected if threshold 3 remains at 1 m. Moreover, the depth of field is shallow. Accordingly, the change of a subject is determined too sensitively at the conventional threshold 2; therefore, the number of erroneous determinations increases. From the above reasons, threshold 2 is set at a larger value in the macro-shooting area 2304 than in other area as indicated by a line 2306, and threshold 3 is set at a value (0 m) that has no influence.

As described above, thresholds for determining the change of a subject are changed according to the subject distance, the depth of field, and the f-number. Accordingly, a determination can be stably made.

In the embodiment, the case where thresholds are set as in FIGS. 11A to 11C. However, this is an example and modifications can be made within the scope that does not depart from the intention.

Next, in S2206, it is determined whether or not the amount of change in the amount of defocus is equal to or greater than threshold 1 (equal to or greater than the predetermined first value). If the amount of change in the amount of defocus is equal to or greater than threshold 1, execution proceeds to S2207. On the other hand, if the amount of change in the amount of defocus is less than threshold 1 (less than the predetermined first value), execution proceeds to S2209.

In S2207, it is determined whether or not the ratio of the distance between the focus and the subject to the depth of field is equal to or greater than threshold 2 (equal to or greater than the predetermined second value), and whether or not the distance between the focus and the subject is equal to or greater than threshold 3 (equal to or greater than the predetermined third value). If so, it is determined that the subject has been changed, and execution proceeds to S2208. If not, execution proceeds to S2211.

In S2208, the subject has been changed; accordingly, the camera control unit 212 turns on the subject change focus stop flag to perform control in such a manner as to stop the drive of the focus lens 103, and terminates the process. In S2209, it is determined whether or not the subject change focus stop flag is on. If on, execution proceeds to S2210. If not, execution proceeds to S2217.

In S2210, it is determined whether or not the ratio of the distance between the focus and the subject to the depth of field is equal to or greater than threshold 2 (equal to or greater than the predetermined second value), and whether or not the distance between the focus and the subject is equal to or greater than threshold 3 (equal to or greater than the predetermined third value). If so, it is determined that the change (switching) of the subject continues, and execution proceeds to S2212. If not, execution proceeds to S2211.

In S2211, the camera control unit 212 turns off the subject change focus stop flag to perform control in such a manner as to continue the drive of the focus lens 103, determining that there was no change in subject, and terminates the process.

In S2212, a subject change count is incremented, and execution proceeds to S2213.

In S2213, it is determined whether or not the count is equal to or greater than predetermined second time of response time. If the count is equal to or greater than the predetermined second time, execution proceeds to S2214. If not, execution proceeds to S2216. The predetermined second time of the response time is the value set in S507. S2213 is a process of determining whether or not the count exceeds the response time.

In S2214, the subject change count is cleared. Execution then proceeds to S2215.

In S2215, the camera control unit 212 turns on a subject change focus drive flag to perform control in such a manner as to restart the drive of the focus lens 103, and terminates the process.

In S2216, the subject change focus stop flag is turned off to terminate the process.

In S2217, the subject change focus drive flag is turned off to terminate the process.

As described above, if the ratio of the distance between the focus and the subject to the depth of field is equal to or greater than the predetermined second value based on the depth of field, and the subject distance is equal to or greater than the predetermined third value, in the subject change determination process of the embodiment, the camera control unit 212 determines that the subject has been switched. Consequently, even when, for example, the distance between an imaging apparatus and a subject is long, and a variation may occur in the focus detection result of the phase difference detection system, whether or not the subject has been switched can be determined with higher accuracy than the known technology.

[The Focus Mode Determination]

Figure 12:
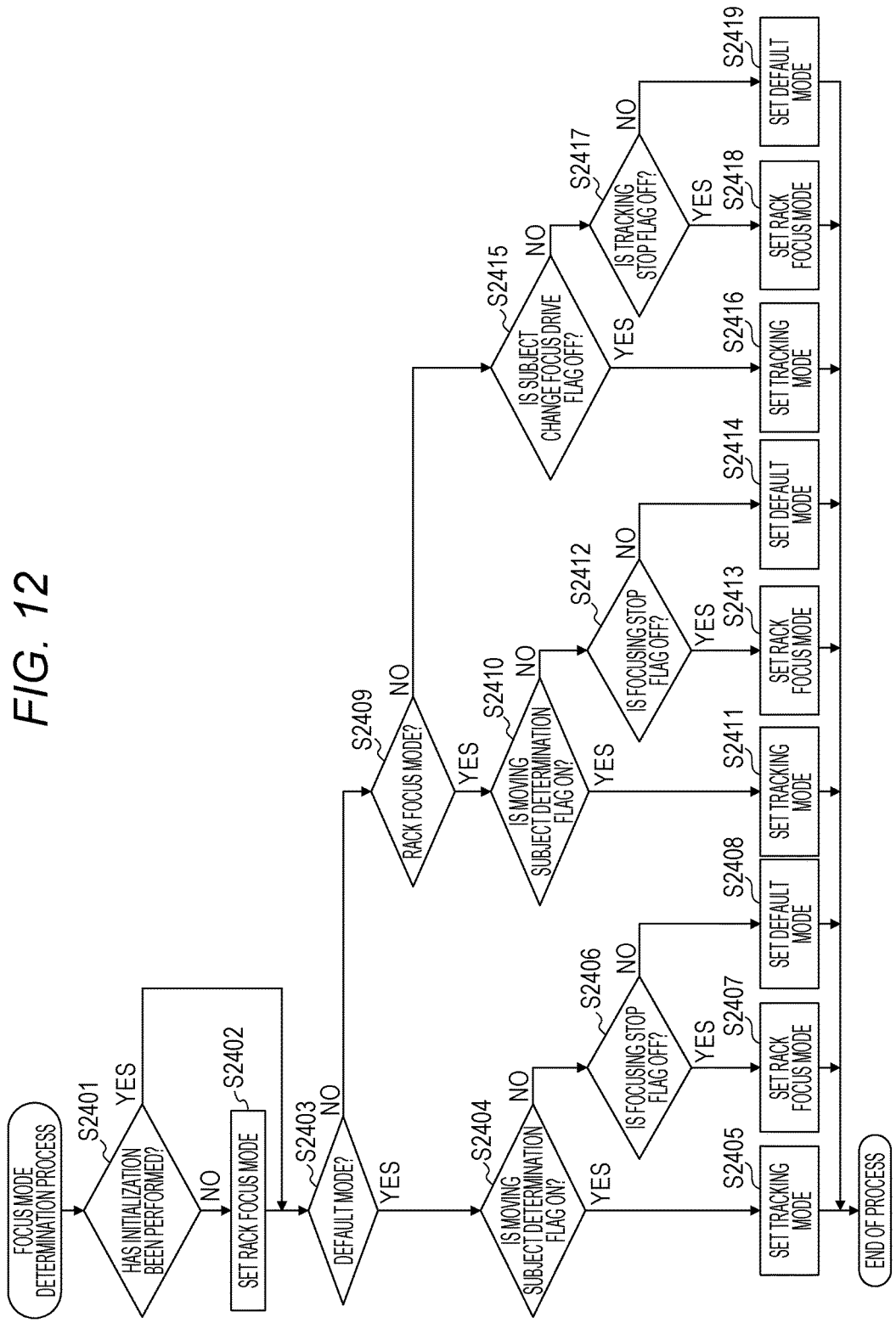
FIG. 12 is a flowchart illustrating the determination of a focus mode in at least one embodiment.

The focus mode determination process is described with reference to FIG. 12. In S2401, the camera control unit 212 determines whether or not initialization has already been performed. If initialization has not been performed, the focus mode is set in the rack focus mode in S2402. Execution proceeds to S2403. If not, execution proceeds to S2403 not via S2402. The initialization process is a process that is performed whenever the shooting mode or the like is switched.

In S2403, the camera control unit 212 determines whether or not the focus mode is the default mode. If the focus mode is the default mode, execution proceeds to S2404. If not, execution proceeds to S2409.

In S2404, the camera control unit 212 determines the presence or absence of the moving subject determination flag. If the moving subject determination flag is on, execution proceeds to S2405. The focus mode is set in the tracking mode to terminate the control.

If the moving subject determination flag is not on, execution proceeds to S2406. The camera control unit 212 determines the presence or absence of a focusing stop flag. If the focusing stop flag is off, execution proceeds to S2407. The focus mode is set in the rack focus mode to terminate the control. If not, the focus mode is set in the default mode in S2408 to terminate the control.

In S2409, the camera control unit 212 determines whether or not the focus mode is the rack focus mode. If the focus mode is the rack focus mode, execution proceeds to S2410.

If not, execution proceeds to S2415. In S2410, the presence or absence of the moving subject determination flag is determined. If the moving subject determination flag is on, execution proceeds to S2411. The focus mode is set in the tracking mode to terminate the control. If not, execution proceeds to S2412. The camera control unit 212 determines the presence or absence of the focusing stop flag. If the focusing stop flag is off, execution proceeds to S2413. The focus mode is set in the rack focus mode to terminate the control. If not, the focus mode is set in the default mode in S2414 to terminate the control.

In S2415, the current focus mode is the tracking mode; accordingly, the presence or absence of the subject change focus drive flag is determined. If the focus drive flag is off, execution proceeds to S2416. The focus mode is set in the tracking mode to terminate the control. If not, execution proceeds to S2417. The camera control unit 212 determines the presence or absence of a tracking stop determination flag. If the tracking stop determination flag is off, execution proceeds to S2418. The focus mode is set in the rack focus mode to terminate the control. If not, the focus mode is set in the default mode in S2419 to terminate the control.

[The AF Restart Determination]

Next, the AF restart determination of S512 that is made if the camera control unit 212 determines in S511 of FIG. 3 that the focus mode is the default mode is described with reference to a flowchart of FIG. 4. The AF restart determination is a process of the camera control unit 212 determining whether or not to drive the focus lens again from the state where the focus lens has achieved focus and is stopping.

In S701, the camera control unit 212 judges whether or not the amount of default calculated is smaller than predetermined times the depth of focus (a predetermined fourth value). If the amount of defocus is less than the predetermined fourth value, execution proceeds to S702. If the amount of defocus is equal to or greater than the predetermined fourth value, execution proceeds to S704. The threshold (the predetermined fourth value) of the amount of defocus set in S701 is assumed to be a value that considers to make the restart easy when a main subject is changed, and to make an inadvertent restart hard when the main subject is not changed. As an example in the embodiment, one times the depth of focus that allow a blur of the main subject to be perceptible is set at the predetermined fourth value.

In S702, it is judged whether or not the reliability calculated is a value higher than a predetermined value. If it indicates a higher value, execution proceeds to S703. If it indicates a lower value, execution proceeds to S704. The threshold of reliability set in S702 is set at, for example, a value indicating such low reliability that it is difficult to rely on the defocus direction as a value regarded that the main subject has been changed. For example, it may be similar to a predetermined value α of S901. In this manner, whether or not a main subject has been changed is judged using the thresholds set in S701 and S702.

In S703, an AF restart counter is reset. Execution then proceeds to S705. In S704, the AF restart counter counts up. Execution then proceeds to S705. As described above, if the amount of defocus is larger than the predetermined value, or if reliability is lower than the predetermined value, the main subject being shot may have been changed. Accordingly, in S704, the AF restart counter counts up to prepare for the restart of AF. If the detected amount of defocus is less than the predetermined fourth value, and high reliability is maintained, the AF restart counter is reset in S703 to cause the focus lens 103 to continue stopping.

Next, in S705, an AF restart threshold is set. Execution then proceeds to S706. The camera control unit 212 performs the AF restart threshold setting of S705, using the response time determined in S507 as the threshold.

In S706 to which execution proceeds after the AF restart threshold is set in S705, it is judged whether or not the AF restart counter is equal to or greater than the AF restart threshold. If applicable, execution proceeds to S707. If not applicable, the process is terminated. In S707, the camera control unit 212 performs control in such a manner as to turn off the focusing stop flag, restart AF, and resume driving the focus lens, and terminates the process.

Upon restarting AF in S706, the camera control unit 212 judges whether or not the AF restart counter that counted up in S704 is larger than the threshold set in S705.

[The AF Process in Rack Focus Mode]

Figure 3:
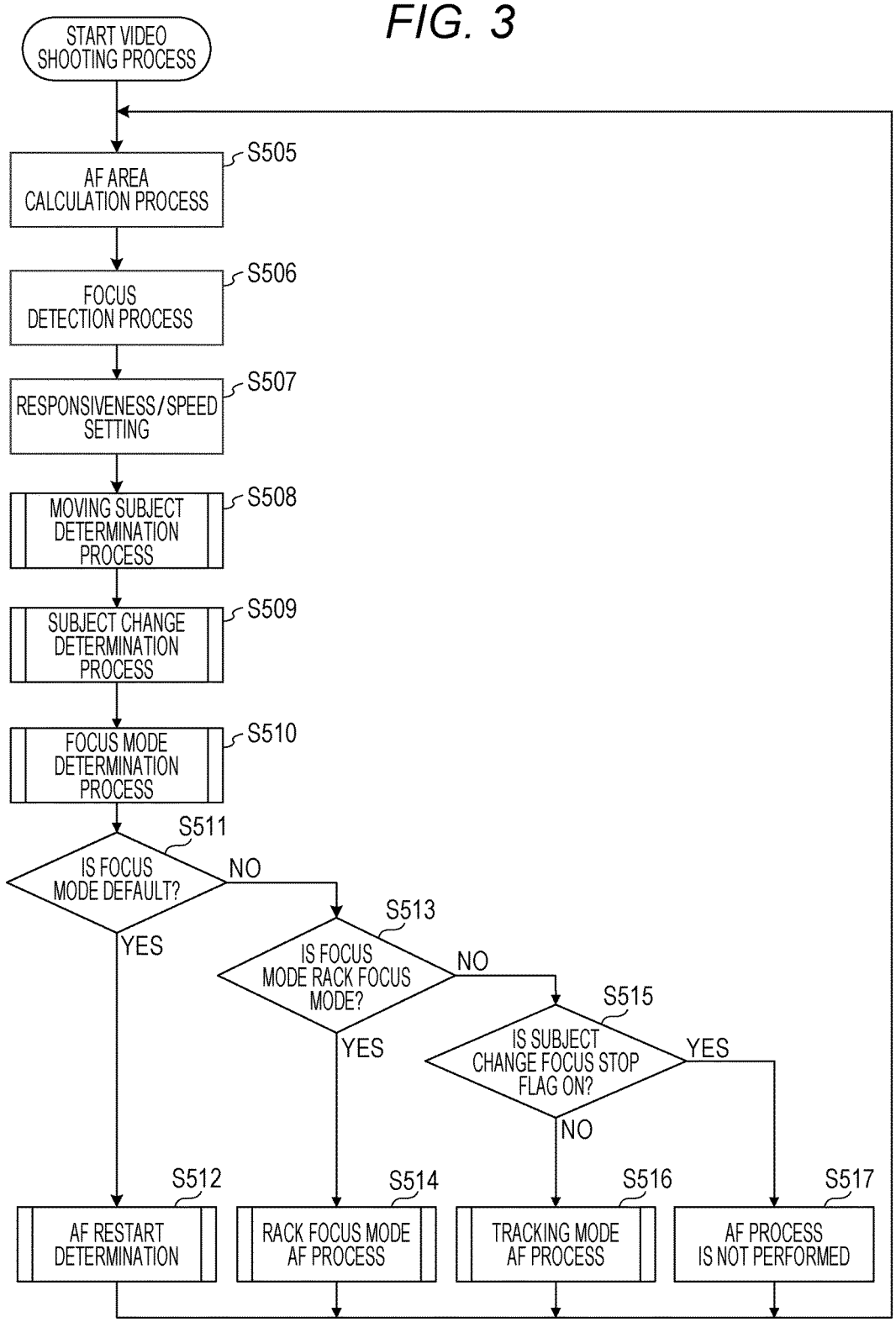
FIG. 3 is a flowchart illustrating a video shooting process in at least one embodiment.
Figure 4:
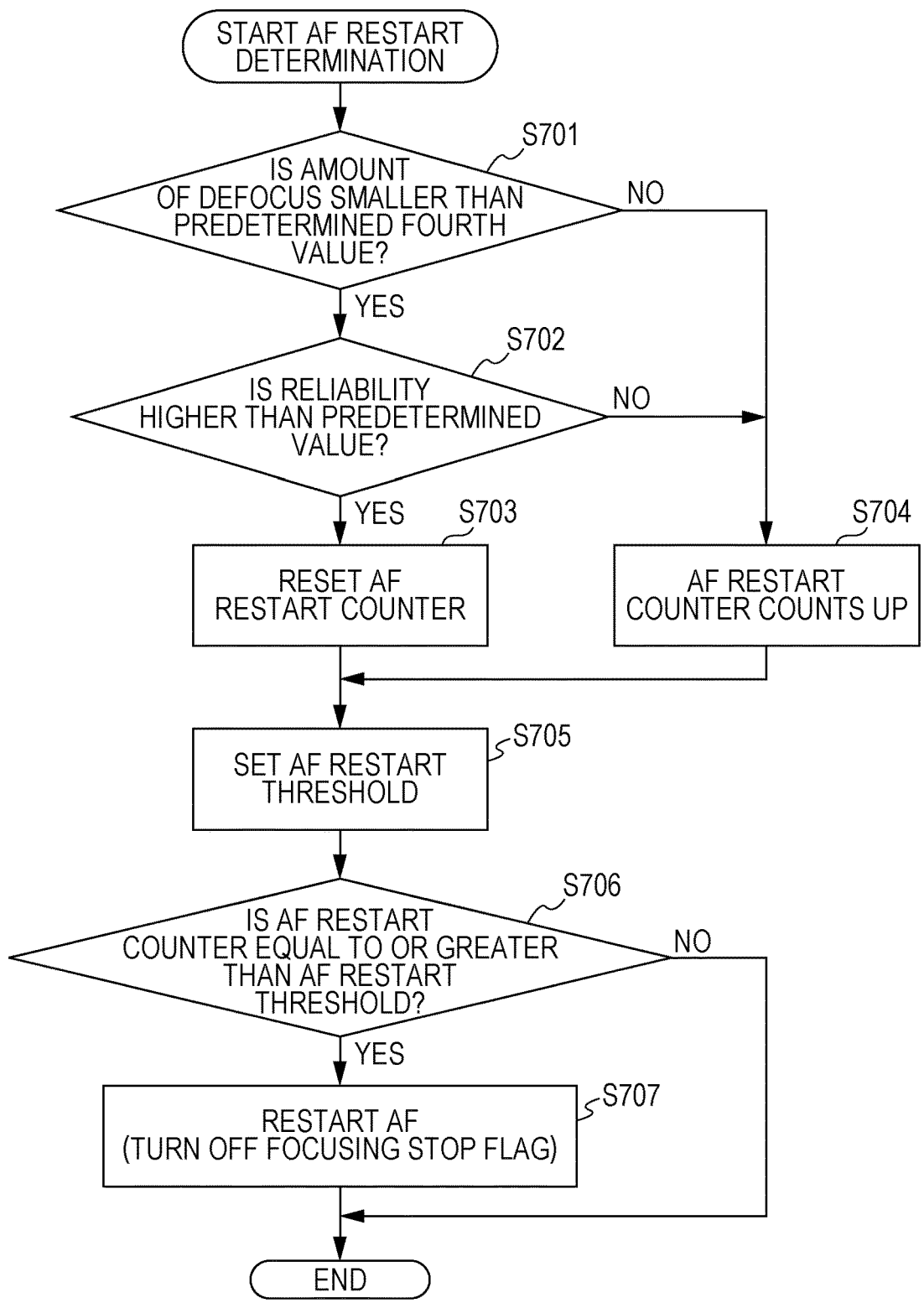
FIG. 4 is a flowchart illustrating AF restart determination in at least one embodiment.

Next, the AF process of S514 of FIG. 3 is described with reference to a flowchart of FIG. 5. The rack focus AF process is a process of driving the focus lens in a state where focusing is not stopped, and determining whether or not to stop focusing.

In S801, it is judged whether or not the amount of defocus is within the depth of focus, and whether or not reliability indicates a higher value than the predetermined value. If this condition is applicable, execution proceeds to S802. If not, execution proceeds to S803. In the embodiment, the threshold used in S801 is set at one times the depth of focus. However, the threshold used in S801 may be set larger or smaller if needed.

In S802, the camera control unit 212 turns on the focusing stop flag to terminate the process.

In S803, the camera control unit 212 sets the lens drive speed. Execution proceeds to S804. The details of the lens drive speed setting of S803 are described below with reference to FIG. 6.

In S804, the camera control unit 212 performs control in such a manner as to perform a lens drive process to terminate the process of this flow. The details of the lens drive process of S804 are described below with reference to FIG. 7.

[The Lens Drive Speed Setting]

Figure 5:
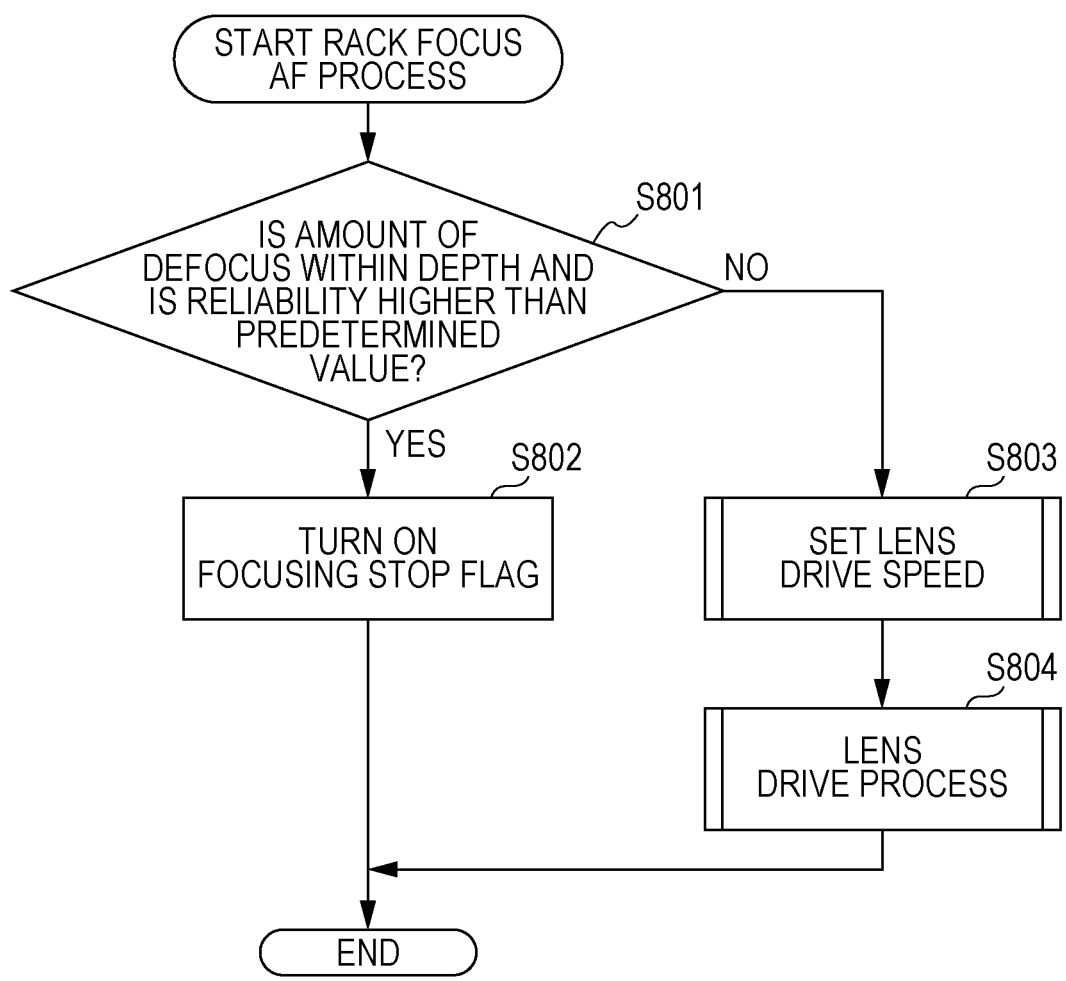
FIG. 5 is a flowchart illustrating a rack focus AF process in at least one embodiment.

Next, the lens drive speed setting of S803 of FIG. 5 is described with reference to a flowchart of FIG. 6.

In S901, the camera control unit 212 judges whether or not reliability is less than the predetermined value α. If reliability is lower than the predetermined value α, execution proceeds to S902. If reliability is equal to or greater than the predetermined value α, execution proceeds to S905. The predetermined value α is set at a value at which it is possible to determine that at least the defocus direction is reliable.

In S902, a search drive shift counter counts up. Execution proceeds to S903.

In S903, the camera control unit 212 judges whether or not the search drive shift counter is equal to or greater than a set predetermined value. If the search drive shift counter is equal to or greater than the predetermined value, execution proceeds to S904. If the search drive shift counter is not equal to or greater than the predetermined value, execution proceeds to S906. In S904, a search drive flag is turned on. Execution then proceeds to S906.

In S906, the camera control unit 212 determines whether or not the focus mode is the rack focus mode. If the focus mode is the rack focus mode, execution proceeds to S907. If not, execution proceeds to S912.

In S907, the camera control unit 212 determines whether or not the search flag is on. If the search flag is on, a speed for a search is set in S908. In terms of the setting of a speed for a search, the speed is changed, using information from an unillustrated speed setting menu, in stages in accordance with the menu. The search drive is a focusing operation that is performed at a level of reliability that indicates that the amount of defocus is not reliable. The search drive is configured as follows: The camera control unit 212 performs control in such a manner as to set a defocus direction irrespective of the amount of defocus and drive the focus lens at the set speed in the set direction; The search drive shift counter counts up to determine whether or not the search drive shift counter is equal to or greater than the predetermined value; Only when it can be judged that there is a possibility that reliability is continuously low and the subject is out of focus, the search drive can be performed. The search drive is drive that does not use the amount of defocus. Accordingly, focusing that temporarily increases the level of blurring may be performed. Hence, a user sets responsiveness in such a manner as to prevent an immediate shift to the search drive even if reliability is reduced; accordingly, it is possible to prevent inadvertent search drive.

In S909, it is determined whether or not the moving direction of a moving subject in the closest distance direction or infinite distance direction and the drive direction of the focus lens agree with each other. If they do not agree with each other, execution proceeds to S910. If they agree with each other, execution proceeds to S911.

In S910, a normal speed setting is performed. In the normal speed setting, information from the unillustrated speed setting menu is used to change the speed in stages in accordance with the menu.

In S911, if the moving speed of the moving subject and the drive direction of the lens agree with each other, it is determined whether or not the set drive speed of the focus lens 103 is a speed that allows the focus lens 103 to catch up with the moving subject. As an example in the embodiment, a difference between the current focus lens position and the previous focus lens position is compared with a difference between the current target lens position and the previous target lens position. The current target lens position is a target lens position based on the current focus lens position and the current focus detection result. Moreover, the previous target lens position is a target lens position based on the previous focus lens position and the previous focus detection result. If the difference between the current focus lens position and the previous focus lens position is equal to or greater than the difference between the current target lens position and the previous target lens position, the camera control unit 212 determines that it is a speed that allows the focus lens 103 to catch up with the moving subject. If the camera control unit 212 has determined that it is a speed that allows catching up (a speed that allows tracking of the moving subject), execution proceeds to S910. If the difference between the current focus lens position and the previous focus lens position is less than the difference between the current target lens position and the previous target lens position, the camera control unit 212 determines that it is a speed that does not allow the focus lens 103 to catch up with the moving subject. If the camera control unit 212 has determined that it is a speed that does not allow catching up (the speed is too low to track the moving subject), execution proceeds to S912.

In S912, the moving subject is moving at the speed that does not allow the focus lens 103 to catch up at its currently set drive speed. Accordingly, it is a state where focus cannot be achieved. Hence, the speed is set at a higher speed than normal to make it possible to catch up with the moving subject.

S913 is a speed setting in tracking mode. In the speed setting, a speed that agrees with the speed of the moving subject is set to make it possible to track the moving subject.

Figure 6:
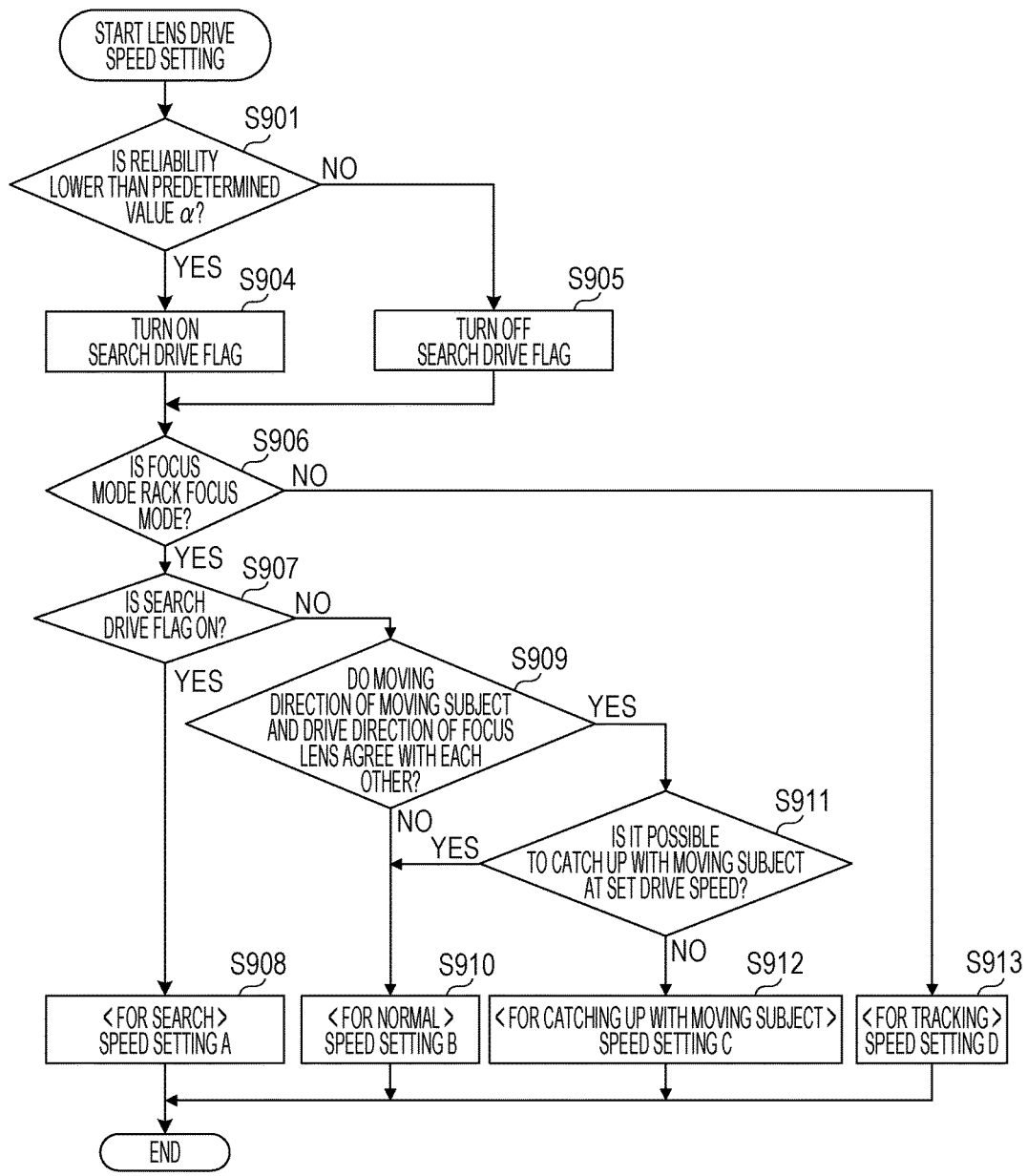
FIG. 6 is a flowchart illustrating a lens drive speed setting in at least one embodiment.

The relationship of the lens drive speeds in FIG. 6 is as follows:

Speed A>Speed C>Speed B (Speed D is determined according to the speed of a subject)

While in the search drive, it is assumed that the subject is greatly out of focus. Accordingly, the camera control unit 212 performs control in such a manner as to set the speed at fast speed A to quickly bring the subject into focus. If the subject's move to the closest distance direction or infinite distance direction is recognized by the moving subject determination in rack focus mode, when the directions of the moving subject and the drive of the focus lens 103 agree with each other, their speeds are compared to judge whether or not the focus lens can catch up with the moving subject. If it has been judged that it is not possible to catch up, speed C is set that is faster than normal speed B.

[The Lens Drive Process]

Figure 7:
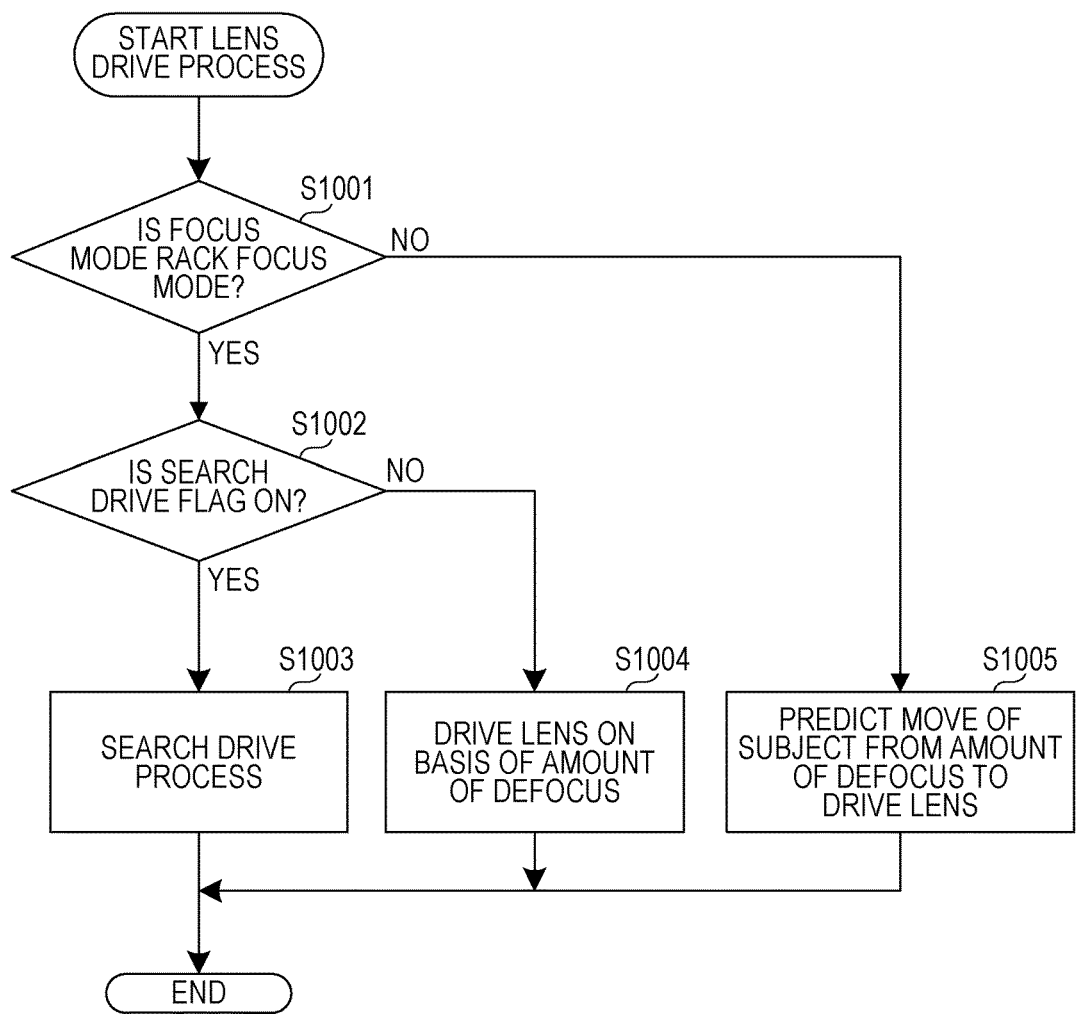
FIG. 7 is a flowchart illustrating a lens drive process in at least one embodiment.

Next, the lens drive process of S804 of FIG. 5 is described with reference to a flowchart of FIG. 7.

In S1001, it is judged whether or not the focus mode is the rack focus mode. If the focus mode is the rack focus mode, execution proceeds to S1002. If the focus mode is the tracking mode, execution proceeds to S1005.

In S1002, it is judged whether or not the search drive flag is on. If on, execution proceeds to S1003. If off, execution proceeds to S1004. In S1003 to which execution proceeds if the search drive flag is on, the search drive is performed to terminate the lens drive process.

In S1003, the search drive process is performed. The search drive process is a process of driving the focus lens 103 until the focus detection result where reliability can be determined to be higher than a predetermined value α is obtained if the camera control unit 212 has determined that reliability is low. The reliability threshold α is the same as the threshold α set in S901 of FIG. 6, and is a value at which at least the direction of the amount of defocus is reliable. If reliability is improved as compared to the threshold α, it can be judged that the subject is coming close to focus. Accordingly, the search drive is stopped to switch back to the control that drives the focus lens on the basis of the amount of defocus. If the lens has reached the closest end or infinity end before a result that it can be determined that reliability is high is obtained, the search drive flag is turned off. If the subject cannot be located, it may be controlled in such a manner as to continue the search drive without turning off the search drive flag.

In S1004, the lens is driven on the basis of the amount of defocus to terminate the lens drive process. Execution proceeds to the case of the tracking mode.

In S1005, the travel distance of the subject is predicted on the basis of the amount of defocus to drive the lens.

[The Tracking AF Process]

Figure 14:
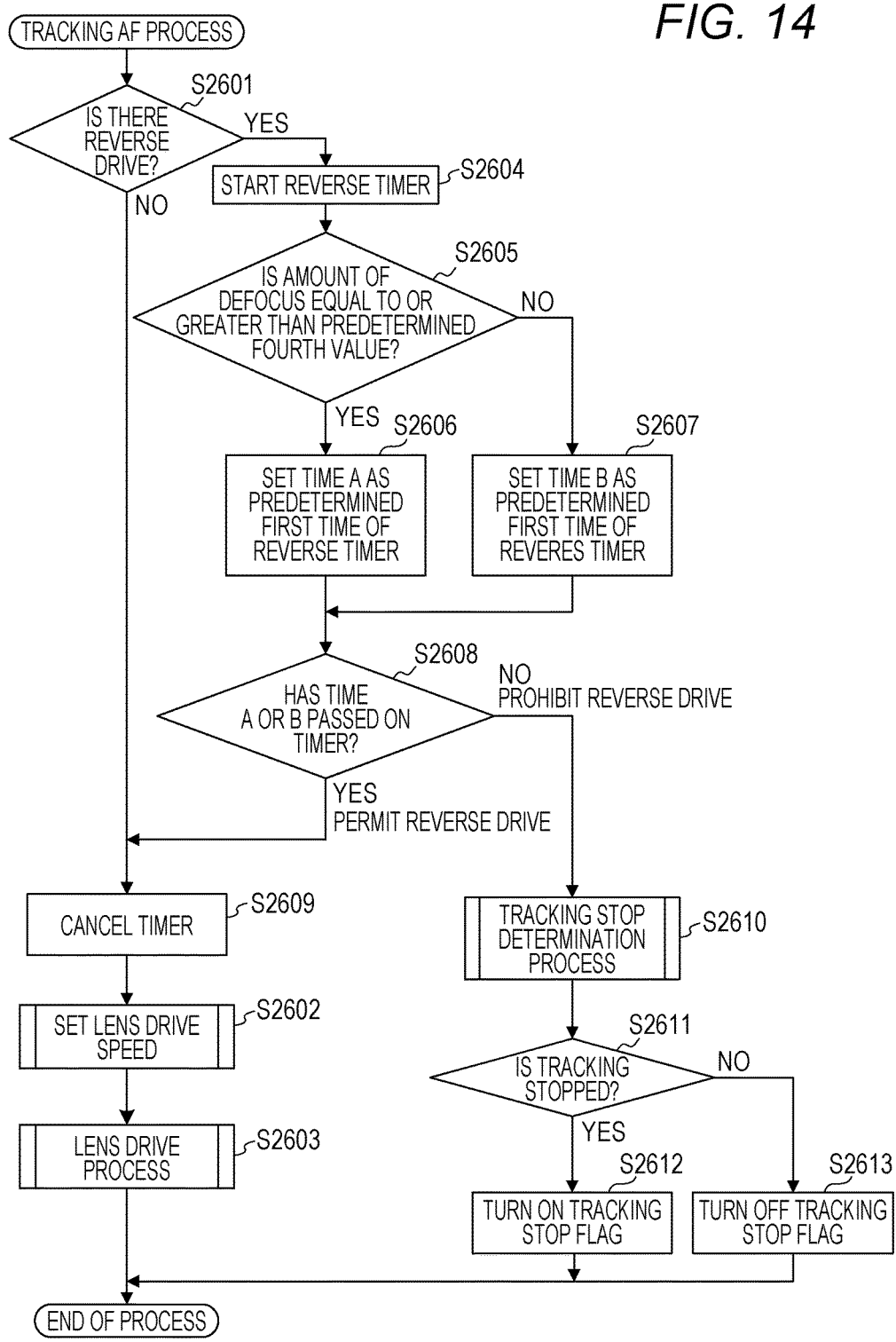
FIG. 14 is a flowchart illustrating a tracking AF process in at least one embodiment.

Next, the tracking AF process is described with reference to FIG. 14. The tracking AF process is the AF process in tracking mode. In tracking mode, the tracking AF process does not simply determine whether or not the magnitude of the latest amount of defocus is within a predetermined range (within a first range) based on the depth of focus as in, for example, S701 and S801 but makes a determination considering a reversed state of the drive direction of the focus lens. The focus position is determined on the basis of whether or not a focus detection result that the direction to drive the focus lens 103 is reversed (is changed to an opposite direction) has been obtained, or its number of times and the target lens position.

Moreover, in the tracking AF process, the reverse drive is restricted. The reverse drive is drive that reverses the drive direction of the focus lens 103 between the closest distance direction and the infinite distance direction on the basis of the focus detection result that reverses the direction to drive the focus lens 103 (for example, the amount of defocus including information on the drive direction of the focus lens 103). The reverse drive is restricted to improve especially the quality of video upon the tracking AF.

In S2601, the camera control unit 212 determines the presence or absence of the reverse drive. If there is the reverse drive, execution proceeds to S2609. If not, execution proceeds to S2604. In the embodiment, the camera control unit 212 determines that there is the reverse drive if the amount of defocus that reverses the drive direction of the focus lens has been detected, and that there is not the reverse drive if the amount of defocus that does not reverse the drive direction of the focus lens has been detected.

In S2609, the camera control unit 212 clears a timer that restricts the reverse drive. Execution proceeds to S2602.

In S2602, the lens drive speed setting is performed as in S803. In S2603, the camera control unit 212 performs control in such a manner as to perform the lens drive process as in S804 to terminate the process of this flow.

In S2604, the reverse timer starts. Execution proceeds to S2605. The reverse timer of the embodiment is a timer that applies a restriction only for predetermined first time (described below) in such a manner as to prevent the reverse drive of the focus lens 103 if the camera control unit 212 has judged in S2601 that there is the reverse drive.

In S2605, the camera control unit 212 determines whether or not the amount of defocus is equal to or greater than the predetermined fourth value. This is a process for changing the time required by the reverse timer to control the reverse drive, according to the amount of defocus. As an example in the embodiment, the predetermined fourth value is set at three times the depth of focus. If the amount of defocus is equal to or greater than the predetermined fourth value, execution proceeds to S2606. If the amount of defocus is less than the predetermined fourth value, execution proceeds to S2607.

In S2606, S2607, the camera control unit 212 sets the predetermined time (the predetermined first time) being a threshold of the reverse timer at time A or B. The camera control unit 212 performs control in such a manner as not to drive the focus lens 103 until the time set as the threshold of the reverse timer passes. The relationship between time A and time B is as follows:

Time A<Time B

As an example in the embodiment, time A is set at 0.3 seconds and time B is set at one second. The reason why time A is made shorter than time B is because if the amount of defocus equal to or greater than three times the depth of focus has been detected, there is a high possibility that a subject is not stopping but is making a turn. In this case, shorter time is set to make it easy to reverse the drive of the focus lens 103 in accordance with the movements of the subject.

On the other hand, if the amount of defocus is less than three times the depth of focus, it is highly likely because of a variation in focus detection result and a variation in the amount of defocus at the time when the subject stops moving. Accordingly, time B, which is longer than time A, is set. Consequently, the drive of the focus lens 103 is restricted in accordance with a variation in focus detection result at the time of focusing stop to improve the quality of an image. In this manner, the threshold is changed according to the drive direction; accordingly, it becomes possible to perform control in such a manner as to maintain trackability for a subject that actually makes a turn and to stop the focus lens with the quality of an image maintained if the subject being a moving subject stops.

In S2608, the camera control unit 212 determines whether or not the set predetermined first time (time A or B) has passed since the reverse timer started. If the reverse timer exceeds the predetermined first time, the camera control unit 212 permits the reverse drive of the focus lens 103. If not, execution proceeds to S2610. The camera control unit 212 performs control in such a manner as to perform a tracking stop determination process. In other words, the camera control unit 212 performs control in such a manner as to stop the drive of the focus lens 103 until it exceeds the predetermined first time.

In S2610, the tracking stop determination process is performed. This process is described below with reference to FIGS. 15 and 16.

In S2611, the camera control unit 212 determines whether or not to stop tracking. If tracking is stopped, execution proceeds to S2612. The camera control unit 212 performs control in such a manner as to turn on a tracking stop flag and terminate the process of this flow. If not, execution proceeds to S2613. The camera control unit 212 performs control in such a manner as to turn off the tracking stop flag and terminate the process of this flow.

As described above, in the embodiment, the camera control unit 212 performs control in the tracking AF in tracking mode in such a manner as to change the drive of the focus lens 103 between the cases where there is and is not the reverse drive. In the tracking AF in tracking mode, it is not determined to stop focusing, depending on whether or not the detected amount of defocus is within the depth of focus. On the other hand, if it is determined to stop focusing if the detected amount of defocus is within the depth of focus, when the amount of defocus obtained as a result of performing focus detection on a moving subject is within the depth of focus, it is determined to have achieved focus, which ends up temporarily stopping focus adjustment. In order to detect the moving subject again after focus adjustment is temporarily stopped and cause the focus lens to track the moving subject, a time lag occurs. Blurring may occur in this time lag. In other words, in tracking mode of the embodiment, it is not determined to stop focusing depending on whether or not the detected amount of defocus is within the depth of focus. Accordingly, the quality of an image at the time of tracking a moving subject can be improved.

[An Overview of the Tracking Stop Determination]

Next, the tracking stop determination of S2610 (FIG. 14) is described with reference to FIGS. 15 and 16. FIG. 16 is a diagram describing an overview of the tracking stop determination. In FIG. 16, a case is assumed where the focus lens 103 has reached near the focus position in tracking mode.

If focus detection is performed when the focus lens 103 is near the focus position, variations occur in focus detection results in the closest distance direction and the infinite distance direction with the focus position as the center. This characteristic is used to allow the camera control unit 212 (a focus determination unit) to determine whether or not a subject is in focus (whether or not to stop tracking) on the basis of the number of times of reciprocation of the target lens position based on the focus detection result between infinity and the close end, and each target lens position.

A solid line 2801 indicates an actual position of the focus lens 103. A dotted line 2802 indicates a target lens position of the focus lens 103 considering the amount of defocus detected by focus detection. Until a position 2803, the direction of the amount of defocus detected in S506 is not reversed with respect to the drive direction of the focus lens 103, and the actual lens position and the target lens position agree with each other. From the position 2803 onward, the direction of the amount of defocus detected in S506 is reversed. In the embodiment, if the direction of the amount of defocus detected in S506 is reversed in tracking mode, it is controlled in such a manner as to prevent the drive of the focus lens from reversing for the predetermined time (predetermined first time). The actual lens position during the predetermined time is indicated by a solid line 2805. In contrast, variations have occurred in focus detection results. Accordingly, from the position 2803 onward in FIG. 5, the actual lens position and the target lens position do not agree with each other.

In terms of the tracking stop determination, the camera control unit 212 makes the determination on the basis of at least three focus detection results and at least three target lens positions. The target lens positions 2803, 2804, and 2806 are detected to calculate an average position of the target lens positions of a reverse, or an average position of one target lens position at the closest end and one target lens position at infinity. Accordingly, a center position 2810 is obtained. Next, a difference 2808 between the target lens position 2804 and the target lens position 2806 is determined whether or not to be within a second range (within two times the depth of focus as an example in the embodiment) (condition 1). A difference 2809 between a target lens position 2807 and the center position 2810 based on the latest focus detection result is determined whether or not to be within a third range (within one times the depth of focus as an example in the embodiment) (condition 2). If the above two conditions are satisfied, it is determined that the subject tracked has stopped.

The embodiment illustrates an example where a plurality of amounts of defocus detected at the target lens position 2803 is the amounts of defocus that drive the focus lens 103 in alternatingly different directions. In contrast, even if the amounts of defocus that drive the focus lens 103 in different directions have not continuously been detected, conditions 1 and 2 are simply required to be similarly determined.

[The Flow of the Tracking Stop Determination]

Figure 15:
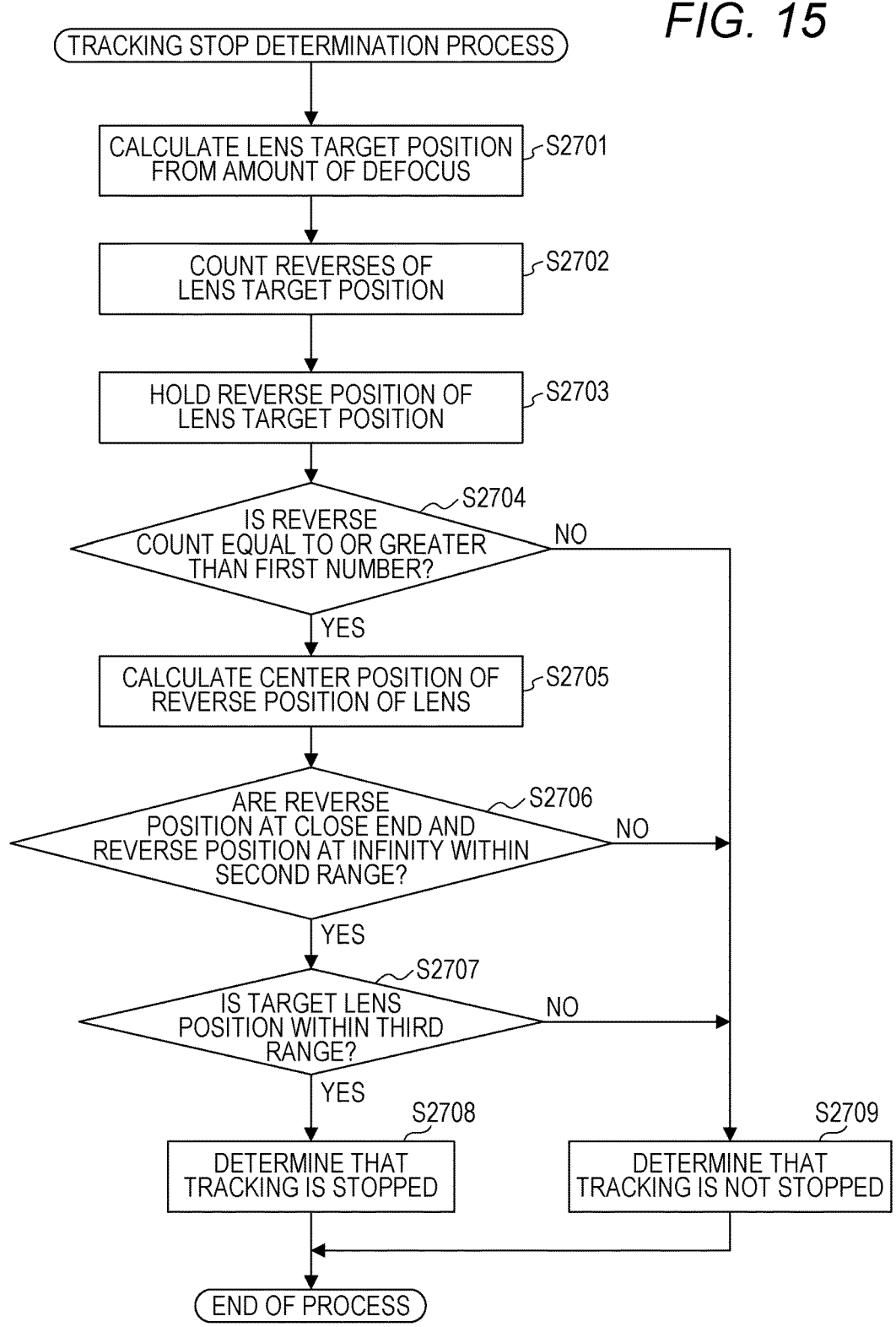
FIG. 15 is a flowchart illustrating a method for a stop determination process in at least one embodiment.
Figure 16:
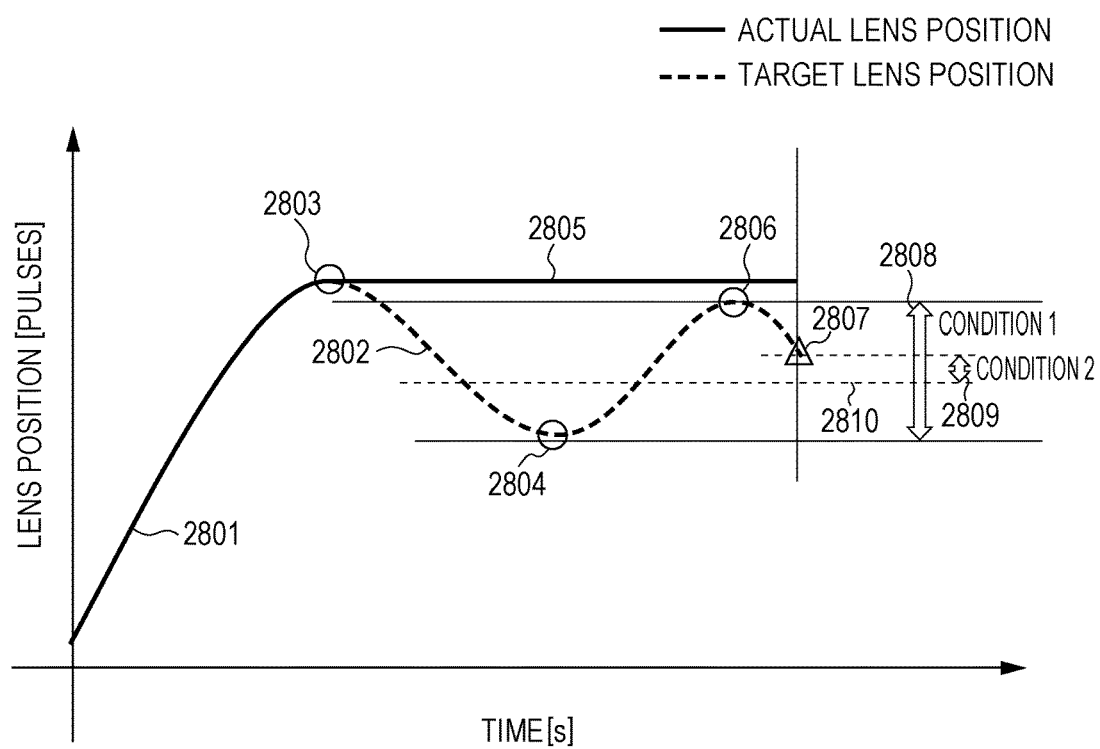
FIG. 16 is a diagram illustrating stop determination in at least one embodiment.

FIG. 15 is a flowchart illustrating the contents described in FIG. 16.

In S2701, the AF signal processing unit 204 calculates the target lens position of the focus lens 103 from the amount of defocus calculated in S506. Execution proceeds to S2702.

In S2702, the camera control unit 212 counts reverses at the target lens position with respect to the drive direction of the focus lens 103 based on the previous focus detection result. Execution proceeds to S2703.

In S2703, the target lens position where the drive direction of the focus lens 103 is reversed (also referred to as the reverse position) is stored in the SDRAM 209. Execution proceeds to S2704.

In S2704, it is determined whether or not the reverse count is equal to or greater than a first number (equal to or greater than three in the embodiment). If the reverse count is equal to or greater than the first number, execution proceeds to S2705. If not, execution proceeds to S2709. It is determined not to stop tracking to terminate the process.

In S2705, the camera control unit 212 calculates the center position of the reverse position of the lens.

In S2706, the camera control unit 212 determines whether or not the target lens position at the closest end and the target lens position at the most infinite end are within a second range (within two times the depth of focus in the embodiment) with respect to the center position. If they are within the second range, execution proceeds to S2707. If they are not within the second range, execution proceeds to S2709. The camera control unit 212 determines not to stop tracking to terminate the process of this flow.

In S2707, the camera control unit 212 determines whether or not the target lens position is within the third range (within two times the depth of focus in the embodiment) with respect to the center position of the reverse position. If the target lens position is within two times, execution proceeds to S2708. The camera control unit 212 determines to stop tracking to terminate the process of this flow. If not, execution proceeds to S2709. The camera control unit 212 determines not to stop tracking to terminate the process.

As described above, in the embodiment, the camera control unit 212 determines whether or not to have achieved focus in tracking mode in S2704 to S2707, on the basis of the magnitude of the amount of defocus and the reversed state of the drive direction of the focus lens based on the amount of defocus. Consequently, if the amount of defocus that has been obtained as a result of performing focus detection on a moving subject is within the depth of focus, it is possible to prevent determining that focus has been achieved although a moving subject is still moving and temporarily stopping focus adjustment. In this manner, the quality of an image at the time when a moving subject is tracked can be improved as compared to the known technology.

Other Embodiments

In the above-mentioned embodiment, the reverse count is detected on the basis of the focus detection results detected within the predetermined first time set in S2606 or S2607. Instead, it may be simply determined whether or not a focus detection result within the second range is detected a second number of times or more within certain predetermined time. The second number of times is the number of times that it is possible to determine that a subject is not moving if a focus detection result within the second range is continuously detected the second number of times. If a focus detection result within the second range is detected the second number of times or more within the predetermined first time, execution proceeds to S2705. If not, execution proceeds to S2709.

In the tracking stop determination of the above-mentioned embodiment, if the reverse count is three or more in S2704, when both of S2706 and S2707 are satisfied, the focus lens 103 is stopped on the solid line 2805 of FIG. 16. In contrast, the camera control unit 212 may perform control in such a manner as to stop the focus lens 103 at the position 2807 being the nearest target lens position. Consequently, even if the solid line 2805 is not within the depth of focus at the actual focus position, focus can be achieved with higher accuracy.

Moreover, in the tracking stop determination of the above-mentioned embodiment, if the reverse count is three or more in S2704, both of S2706 and S2707 are satisfied, it is determined to stop tracking. In contrast, the camera control unit 212 may determine whether or not to stop tracking, on the basis of only the determination of S2706, without making the determination of S2707. In this case, S2707 is not performed; accordingly, the focus lens 103 cannot be stopped at the position 2807 being the immediate target lens position. However, the focus lens 103 is fixed on the solid line 2805 to reduce the change of the blurred state. Accordingly, the quality of video can be improved.

Moreover, in S911 of FIG. 6 of the above-mentioned embodiment, as a method for determining whether or not the set drive speed of the focus lens 103 is a speed that allows the focus lens 103 to catch up with a moving subject, the previous amount of defocus may be compared with the present amount of defocus. If the amount of defocus detected this time is equal to or greater than the amount of defocus detected last time, the camera control unit 212 determines that it is a speed that does not allow the focus lens 103 to catch up with the moving subject. If the amount of defocus detected this time is less than the amount of defocus detected last time, the camera control unit 212 determines that it is a speed that allows the focus lens 103 to catch up with the moving subject.

Moreover, if a subject is positioned a predetermined distance or more on the infinity side, the determination of S911 may not be made. The predetermined distance or more on the infinity side here is a distance where an error occurs in focus detection to an unacceptable degree upon the determination of S911.

Moreover, in S2207 and S2210 of the above-mentioned subject change determination process (FIG. 10), if the ratio of the distance between the focus and the subject to the depth of field is equal to or greater than the predetermined second value, and if the distance between the focus and the subject is equal to or greater than the predetermined third value, it is determined that the subject has been changed. Instead, it may be determined whether or not the subject has been changed by determining whether or not the ratio of the amount of defocus to the depth of focus is equal to or greater than a predetermined eleventh value and whether or not the amount of defocus is equal to or greater than a predetermined twelfth value. If the ratio of the amount of defocus to the depth of focus is the predetermined eleventh value and if the amount of defocus is equal to or greater than the predetermined twelfth value, the camera control unit 212 determines that the subject has been changed. If the ratio of the amount of defocus to the depth of focus is not equal to or greater than the predetermined eleventh value, and if the amount of defocus is not equal to or greater than the predetermined twelfth value, it is determined that the subject has not been changed.

Moreover, if a result that the ratio of the distance between the focus and the subject to the depth of field is less than the predetermined second value and that the distance between the focus and the subject is equal to or greater than the predetermined third value is obtained a third number of times or more, the camera control unit 212 may determine that the subject has been changed. If a result that the ratio of the distance between the focus and the subject to the depth of field is less than the predetermined second value and that the distance between the focus and the subject is equal to or greater than the predetermined third value is obtained less than the third number of times, it is conceivable that the cause is variations in focus detection results due to a long subject distance. Hence, if the result that the ratio of the distance between the focus and the subject to the depth of field is less than the predetermined second value and that the distance between the focus and the subject is equal to or greater than the predetermined third value is obtained less than the third number of times, it may be determined that the subject has not been changed.

Up to this point the present invention has been detailed on the basis of the preferred embodiment. However, the present invention is not limited to the specific embodiment, and the present invention also includes various modes within the scope that does not depart from the gist of the invention. Especially, in terms of the points where the specific values are illustrated, the specific values are used as examples to facilitate understanding of the description, and other values may be used along the intention of the embodiment. Moreover, in terms of the equations used in the above-mentioned embodiment, as long as their objects can be achieved, other equations may be used.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-169610, filed Aug. 31, 2016, which is hereby incorporated by reference herein in its entirety.

What is claimed is:

1. A lens control apparatus comprising:
one or more processors that operate to:
detect an amount of defocus by a phase difference detection method;
control drive of a focus lens; and
determine a first number which is a number of times a drive direction of the focus lens is to be reversed based on a plurality of amounts of defocus,
wherein in a case where driving of the focus lens is controlled in accordance with movement of a moving subject, the one or more processors stop driving of the focus lens in accordance with the movement of the moving subject in a case where the one or more processors determine that a target lens position is within a first range when the first number is more than or equal to a second number, and wherein the one or more processors continue driving of the focus lens in accordance with the movement of the moving subject in a case where the first number is smaller than the second number.

2. The lens control apparatus according to claim 1, wherein the one or more processors continue driving of the focus lens in accordance with the movement of the moving subject in a case where target lens positions based on the amounts of defocus being out of the first range.

3. The lens control apparatus according to claim 2 wherein the first range is a range based on a depth of focus.

4. The lens control apparatus according to claim 1, wherein the one or more processors stop driving of the focus lens for a first time period upon the amount of defocus that reverses the drive direction of the focus lens having been determined.

5. The lens control apparatus according to claim 4, wherein upon the amount of defocus that reverses the drive direction of the focus lens having been determined, the one or more processors extend the first time period in a case where the amount of defocus is less than a predetermined value as compared to a case where the amount of defocus is equal to or greater than the predetermined value.

6. The lens control apparatus according to claim 4, wherein upon the first time period having passed, the one or more processors control the drive of the focus lens so that the drive direction of the focus lens is reversed.

7. A method for controlling a lens control apparatus, comprising:

a focus detection step of detecting an amount of defocus by a phase difference detection method;

a control step of controlling drive of a focus lens; and a determination step of determining a first number which is a number of times a drive direction of the focus lens is to be reversed based on a plurality of amounts of defocus, wherein in a case where driving of the focus lens is controlled in accordance with movement of a moving subject, the control step stops driving of the focus lens in accordance with the movement of the moving subject in a case where the determination step determines that a target lens position is within a first range when the first number is more than or equal to a second number, and wherein the control step continues driving of the focus lens in accordance with the movement of the moving subject in a case where the first number is smaller than the second number.

* * * * *